United States Patent
Scanlon et al.

(10) Patent No.: US 12,327,485 B2
(45) Date of Patent: *Jun. 10, 2025

(54) SYSTEMS AND METHODS FOR ARTIFICIAL INTELLIGENCE (AI) VIRTUAL REALITY (VR) EMOTIVE CONVERSATION TRAINING

(71) Applicant: The Travelers Indemnity Company, Hartford, CT (US)

(72) Inventors: Ryan M. Scanlon, East Hampton, CT (US); Hoa Ton-That, Glastonbury, CT (US); Douglas L. Roy, Plantsville, CT (US); Michael C. Kunkel, Glastonbury, CT (US); Pee T. Lim, Middletown, CT (US); Andrea Vazquez, Dallas, TX (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,850

(22) Filed: May 31, 2024

(65) Prior Publication Data

US 2024/0321136 A1    Sep. 26, 2024

Related U.S. Application Data

(63) Continuation of application No. 17/838,236, filed on Jun. 12, 2022, now Pat. No. 12,027,061.

(51) Int. Cl.
*G09B 19/00* (2006.01)
*G06F 40/289* (2020.01)
*G09B 5/06* (2006.01)
*G10L 25/63* (2013.01)

(52) U.S. Cl.
CPC ........... *G09B 19/00* (2013.01); *G06F 40/289* (2020.01); *G09B 5/065* (2013.01); *G10L 25/63* (2013.01)

(58) Field of Classification Search
CPC ....... G09B 19/00; G09B 5/065; G06F 40/289; G06F 40/30; G06F 40/35; G10L 25/63; G10L 15/22
See application file for complete search history.

(56) References Cited

U.S. PATENT DOCUMENTS

| | | |
|---|---|---|
| 6,657,628 B1 | 12/2003 | Cook |
| 9,812,151 B1 | 11/2017 | Amini et al. |
| 10,691,897 B1 | 6/2020 | Rajagopal et al. |
| 2019/0243899 A1 | 8/2019 | Yi et al. |
| 2020/0335001 A1 | 10/2020 | Freiwirth |
| 2023/0177255 A1 | 6/2023 | Liao et al. |

OTHER PUBLICATIONS

Office Action for U.S. Appl. No. 17/838,236 dated Aug. 21, 2023; 18 pps.
Notice of Allowance for U.S. Appl. No. 17/838,236 dated Mar. 5, 2024; 13 pps.

*Primary Examiner* — Eddy Saint-Vil
(74) *Attorney, Agent, or Firm* — RowanTree Law Group, PLLC; Carson C. K. Fincham

(57) ABSTRACT

Systems and methods for Artificial Intelligence (AI) Virtual Reality (VR) emotive conversation training.

17 Claims, 12 Drawing Sheets

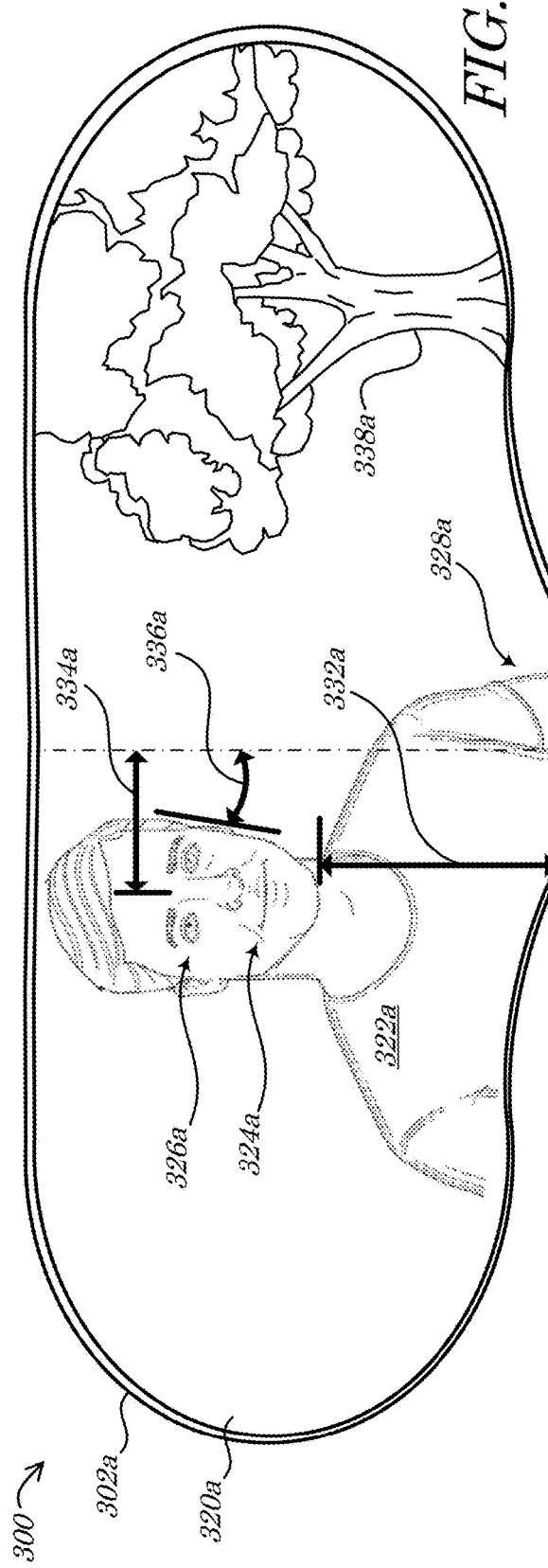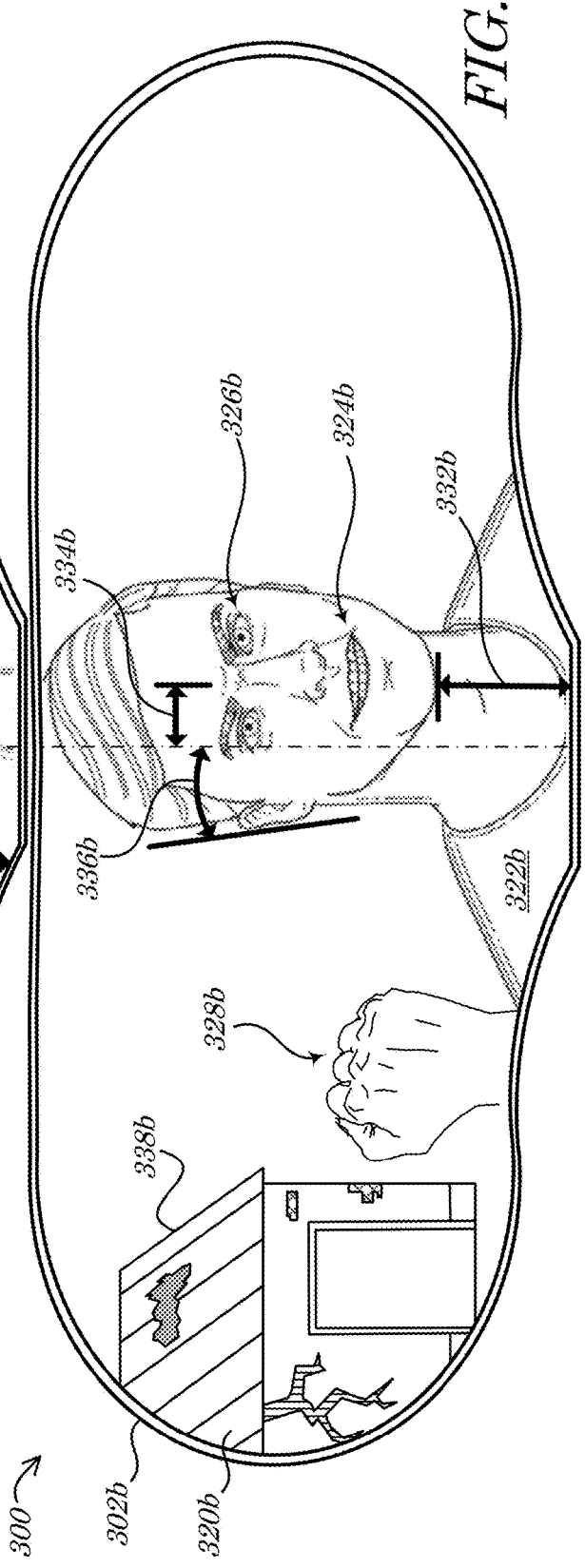

SYSTEMS AND METHODS FOR ARTIFICIAL INTELLIGENCE (AI) VIRTUAL REALITY (VR) EMOTIVE CONVERSATION TRAINING

CROSS-REFERENCE TO RELATED APPLICATIONS

Benefit and priority under 35 U.S.C. § 120 is hereby claimed to, and this is a Continuation of, U.S. patent application Ser. No. 17/838,236 filed on Jun. 12, 2022 and titled "SYSTEMS AND METHODS FOR ARTIFICIAL INTELLIGENCE (AI) VIRTUAL REALITY (VR) EMOTIVE CONVERSATION TRAINING", which issued as U.S. Pat. No. 12,027,061 on Jul. 2, 2024, and which is hereby incorporated by reference herein in the entirety.

BACKGROUND

Interaction between workers and customers, consumers, clients, and/or other individuals is a common and yet critical function in many business and industries. In many roles, a worker's conversational abilities are paramount to their successful completion of their jobs. Nowhere is this likely more true than for the role of salesperson—as employee compensation is often contingently based (at least partially) upon successful dealings with customers (e.g., sales commissions). Training of new employees to master customer interactions has historically been conducted through in-person, instructor-led, role playing training. While this has been a good proxy for real-world interactions, the limited availability of skilled instructors severely limits the ability to onboard new trained employees. Computer-based training aids have been developed to attempt to alleviate instructor shortages (and costs) by providing simulated interactive tutorials. While such solutions have offered on-demand training materials that assist in new worker training, they typically rely on pre-recorded real-world customer actor video segments and multiple-choice (e.g., pre-defined) user interactivity options. Such systems have simply not been able to offer training that is realistic enough for certain work roles.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein:

FIG. 3A and FIG. 3B are diagrams of a system depicting a user device providing instances of an example interface according to some embodiments;

DETAILED DESCRIPTION

I. Introduction

Figure 1:
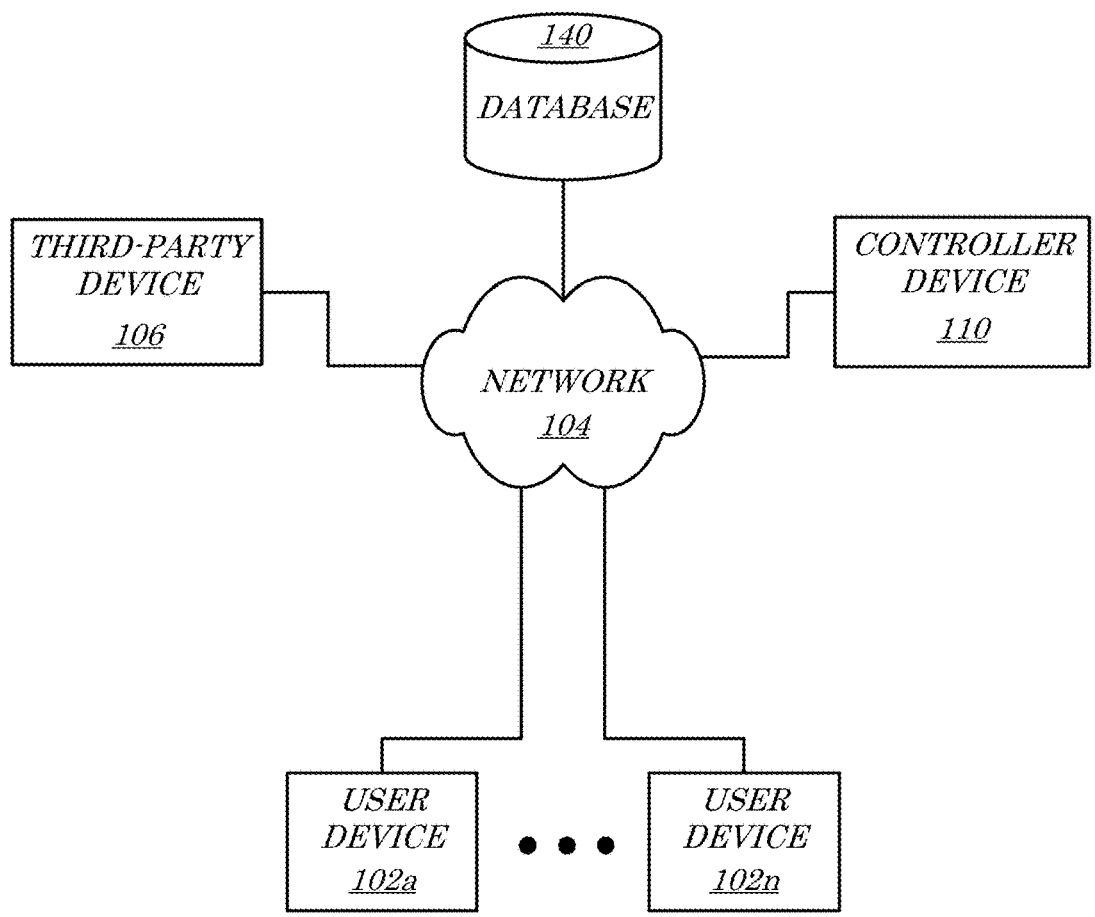
FIG. 1 is a block diagram of a system according to some embodiments.

While some attempts at providing simulated customer interactions have been utilized to supplement or replace human instruction, such systems have been limited to either non-interactive training videos, multiple-choice (e.g., limited interaction) responsive interactions, or textual transcription-based responsive virtual avatars. Each of these types of systems provide some beneficial level of training, but are also either expensive to produce (e.g., video footage of hired actors), fail to provide the ability to take user input into account (e.g., non-interactive), or force user input into predefined paths (e.g., multiple-choice and/or two-dimensional programming paths). In the most advanced previous systems known, for example, while simulated customers may be presented via an interface and such simulated customers may be programmed to respond to user voice input, the simulated customer responses to the input are programmed to follow a predefined set of decision branches (e.g., positive or negative). These systems fail to provide adequate user-feedback and permit users to track through predefined option paths without actually learning from their choices.

In accordance with embodiments herein, these and other deficiencies of previous solutions are remedied by providing systems, apparatus, methods, and articles of manufacture for Artificial Intelligence (AI) Virtual Reality (VR) (e.g., "AI-VR") emotive conversation training. The inventors have realized, for example, that utilization of an AI-VR solution programmed to input, evaluate, and output emotive conversational elements provides an adequate level of feedback-based user training for work roles that require specific and/or specialized customer interaction preparations (e.g., insurance claims adjusters, salespersons, customer service agents, and/or emotive support personnel). In some embodiments, a three-dimensional (3D) and/or AI decision-tree framework may be provided to construct an emotively responsive and dynamic feedback pathway that offers excellent conversational training capabilities. Such a system greatly improves upon previous electronic training options with a low level of cost and high degree of replication and dynamic adaptation. According to some embodiments, for example, users may be automatically guided through dynamically-adjusted VR experiences that provide better-trained employees at lower costs and in reduced timeframes.

II. Artificial Intelligence (AI) Virtual Reality (VR) Emotive Conversation Training Systems Referring first to FIG. 1, a block diagram of a system 100 according to some embodiments is shown. In some embodiments, the system 100 may comprise a plurality of user devices 102*a-n* in communication via or with a network 104. According to some embodiments, the system 100 may comprise a third-party device 106, and/or a controller device 110, e.g., any or all of which may be in communication with or via the network 104. In some embodiments, any or all of the devices 102*a-n*, 106, 110 may comprise and/or be in communication with a database, data storage device, and/or memory device 140. According to some embodiments, communications between and/or within the devices 102a-n, 106, 110, 140 of the system 100 may be utilized to (i) generate a VR environment, (ii) generate a VR avatar, (iii) define virtual conversational elements, (iv) output (e.g., utilizing at least one of the VR environment and the VR avatar) the virtual conversational elements, (v) receive human-generated conversational elements and/or data from a user, (vi) transcribe the human-generated conversational elements/data, (vii) compute a conversational intent metric (e.g., based on an AI analysis of the transcribed human-generated conversational elements/data), (viii) identify a conversational and/or emotive state (e.g., based on an AI analysis of the conversational intent metric), (ix) compute a conversational outcome/path (e.g., based on the conversational and/or emotive state), and/or (x) score the conversation (e.g., based on the conversational outcome/path).

Fewer or more components 102a-n, 104, 106, 110, 140 and/or various configurations of the depicted components 102a-n, 104, 106, 110, 140 may be included in the system 100 without deviating from the scope of embodiments described herein. In some embodiments, the components 102a-n, 104, 106, 110, 140 may be similar in configuration and/or functionality to similarly named and/or numbered components as described herein. In some embodiments, the system 100 (and/or portions thereof) may comprise an AI-VR emotive conversation training system and/or a platform programmed and/or otherwise configured to execute, conduct, and/or facilitate the methods/algorithms 400, 500, 600, 900 of FIG. 4A, FIG. 4B, FIG. 5, FIG. 6, and/or FIG. 9 herein, and/or portions or combinations thereof.

According to some embodiments, the user devices 102a-n may comprise any type or configuration of computing, mobile electronic, network, client, user, and/or communication devices that are or become known or practicable. The user devices 102a-n may, for example, comprise one or more Personal Computer (PC) devices, computer workstations, tablet computers, such as an iPad® manufactured by Apple®, Inc. of Cupertino, CA, and/or cellular and/or wireless telephones, such as an iPhone® (also manufactured by Apple®, Inc.) or an LG V50 THINQ™ 5G smart phone manufactured by LG® Electronics, Inc. of San Diego, CA, and running the Android® operating system from Google®, Inc. of Mountain View, CA. In some embodiments, the user devices 102a-n may comprise one or more devices owned and/or operated by one or more workers, employees, and/or personnel participating in a simulated and/or virtual conversation training program provided by the controller device 110 (and/or an entity associated therewith, such as an insurance company; not shown). According to some embodiments, the user devices 102a-n may communicate with the controller device 110 either directly or via the network 104 to automatically obtain virtual conversational elements and/or conversational training scores, in accordance with the AI-VR emotive conversation training described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the user devices 102a-n, the third-party device 106, and/or the memory device 140. In some embodiments, the network 104 may comprise direct communication links between any or all of the components 102a-n, 106, 110, 140 of the system 100. The user devices 102a-n may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The controller device 110 may, for example, be connected to one or more of the user devices 102a-n via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110, 140 of the system 100. The network 104 may comprise one or more cellular telephone networks with communication links between the user devices 102a-n and the controller device 110, for example, and/or may comprise an NFC or other short-range wireless communication path, with communication links between various user devices 102a-n, for example.

According to some embodiments, the third-party device 106 may comprise any type or configuration of a computerized processing device, such as a PC, laptop computer, computer server, database system, and/or other electronic device, devices, or any combination thereof. In some embodiments, the third-party device 106 may be owned and/or operated by a third party (i.e., an entity different than any entity owning and/or operating either the user devices 102a-n or the controller device 110; such as a certificate, authentication, data storage, demographic, graphical element, and/or cryptographic service provider). The third-party device 106 may comprise, for example, a server via which cloud-based services, such as audio transcription, AI processing, and/or graphical element harvesting services, are provided to the controller device 110 and/or the user devices 102a-n. According to some embodiments, the third-party device 106 may comprise a plurality of devices (e.g., sensors and/or computing devices) and/or may be associated with a plurality of third-party entities. In some embodiments, the third-party device 106 may comprise the memory device 140 (or a portion thereof), such as in the case the third-party device 106 comprises a third-party data storage service, device, and/or system, such as the Amazon® Simple Storage Service (Amazon® S3™) available from Amazon.com, Inc. of Seattle, WA or an open-source third-party database service, such as MongoDB™ available from MongoDB, Inc. of New York, NY.

In some embodiments, the controller device 110 may comprise an electronic and/or computerized controller device, such as a computer server and/or server cluster communicatively coupled to interface with the user devices 102a-n and/or the third-party device 106 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from one or more of the user devices 102a-n and/or the third-party device 106. The controller device 110 may also or alternatively comprise a plurality of electronic processing devices located at one or more various sites and/or locations (e.g., a distributed computing and/or processing network).

According to some embodiments, the controller device 110 may store and/or execute specially programmed instructions (not separately shown in FIG. 1) to operate in accordance with embodiments described herein. The controller device 110 may, for example, execute one or more programs, modules, and/or routines that automatically provide a VR environment and/or avatar to conduct a scored virtual training conversation with a user, as described herein. According to some embodiments, the controller device 110 may execute stored instructions, logic, and/or software modules to (i) generate a VR environment, (ii) generate a VR avatar, (iii) define virtual conversational elements, (iv) output (e.g., utilizing at least one of the VR environment and the VR avatar) the virtual conversational elements, (v) receive human-generated conversational elements and/or data from a user, (vi) transcribe the human-generated conversational elements/data, (vii) compute a conversational intent metric (e.g., based on an AI analysis of the transcribed human-generated conversational elements/data), (viii) identify a conversational and/or emotive state (e.g., based on an AI analysis of the conversational intent metric), (ix) compute a conversational outcome/path (e.g., based on the conversational and/or emotive state), and/or (x) score the conversation (e.g., based on the conversational outcome/path).

In some embodiments, the user devices 102a-n, the third-party device 106, and/or the controller device 110 may be in communication with and/or comprise the memory device 140. The memory device 140 may comprise, for example, various databases and/or data storage mediums that may store, for example, graphical element data, virtual conversational element data, sensor data, object data, classification rules, keyword identification rules, GUI element data, natural text/speech generation and/or transcription data, Optical Character Recognition (OCR) rules and/or data, AI intent data, AI conversational/emotive state data, cryptographic keys and/or data, login and/or identity credentials, and/or instructions (e.g., AI-VR emotive conversation training instructions) that cause various devices (e.g., the controller device 110, the third-party device 106, and/or the user devices 102a-n) to operate in accordance with embodiments described herein.

The memory device 140 may store, for example, various AI-VR emotive conversation training code and/or mobile device applications and/or interface generation instructions, each of which may, when executed, participate in and/or cause the provision and/or generation of a virtual conversation training session, as described herein. In some embodiments, the memory device 140 may comprise any type, configuration, and/or quantity of data storage devices that are or become known or practicable. The memory device 140 may, for example, comprise an array of optical and/or solid-state hard drives configured to store digital image, audio, and/or video data, image, audio, and/or object analysis data, sensor data, and/or AI model data (e.g., analysis formulas and/or mathematical models), credentialing instructions and/or keys, and/or various operating instructions, drivers, etc. In some embodiments, the memory device 140 may comprise a solid-state and/or non-volatile memory card (e.g., a Secure Digital (SD) card, such as an SD Standard-Capacity (SDSC), an SD High-Capacity (SDHC), and/or an SD extended-Capacity (SDXC) and any various practicable form factors, such as original, mini, and micro sizes, available from Western Digital Corporation of San Jose, CA. While the memory device 140 is depicted as a stand-alone component of the controller device 110, the memory device 140 may comprise multiple components. In some embodiments, a multi-component memory device 140 may be distributed across various devices and/or may comprise remotely dispersed components. Any or all of the user devices 102a-n, the third-party device 106, and/or the controller device 110 may comprise the memory device 140 or a portion thereof, for example.

Figure 2:
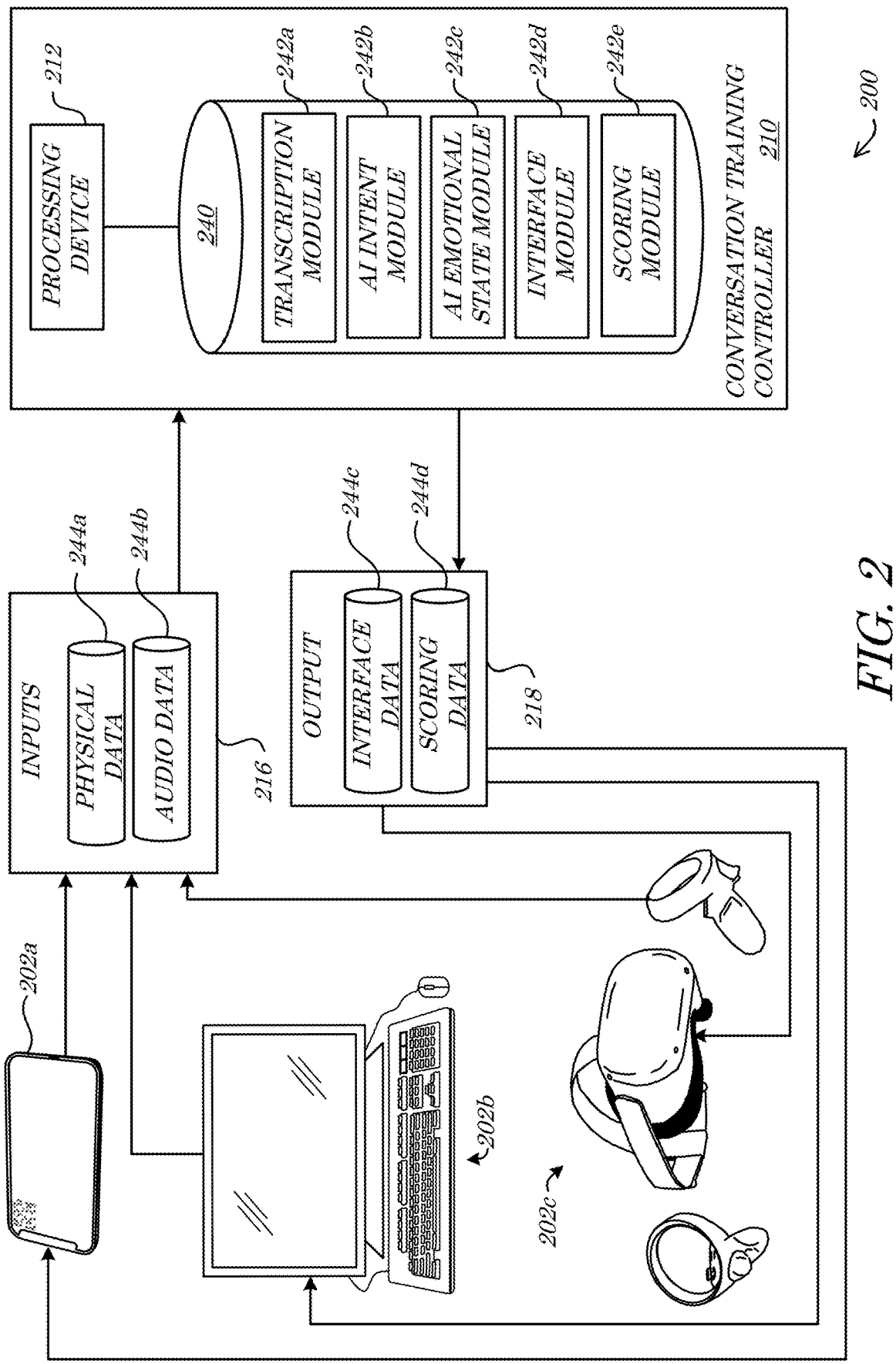
FIG. 2 is a mixed perspective and block diagram of a system according to some embodiments.

Turning to FIG. 2, a block diagram of a system 200 according to some embodiments, is shown. In some embodiments, the system 200 may comprise a system that enables AI-VR emotive conversation training. The system 200 may comprise, for example, one or more user devices 202a-c in communication with a conversation training controller 210 (e.g., comprising one or more processing devices 212) that is programmed to accept, retrieve, identify, and/or receive human conversational input 216 (e.g., defining a human conversational element) and/or to provide computer-generated conversational output 218. According to some embodiments, the system 200 may comprise one or more databases 240, algorithms 242a-e, and/or data elements 244a-d. In some embodiments, any or all of the conversational training components 210, 212, 216, 218, 240, 242a-e, 244a-d may comprise and/or be included in a server and/or centralized processing system and/or may comprise one or more remote and/or distributed objects and/or devices. In some embodiments, some or all of the conversational training components 210, 212, 216, 218, 240, 242a-e, 244a-d may be incorporated into and/or comprise one or more of the user devices 202a-c (in which case FIG. 2 would comprise a partially exploded diagram of the system 200 and/or one or more of the user devices 202a-c thereof).

According to some embodiments, the system 200 may comprise a system configured (e.g., physically and/or communicatively structured and/or coupled, and/or programmed) to automatically provide AI-VR emotive conversation training, e.g., to one or more users (not separately depicted) of the user devices 202a-c. The system 200 may, for example, be configured and/or coupled to receive the input 216 and to provide the output 218 in response thereto. According to some embodiments, the input 216 may comprise physical data 244a and/or audio data 244b received from one or more of the user devices 202a-c. The physical data 244a may comprise, for example, data descriptive of various physical aspects and/or states of a user and/or their environment such as, but not limited to: (i) stance or pose data (e.g., whether the user is sitting or standing, foot position data, etc.), (ii) body angle data (e.g., angle with respect to a camera and/or other location of interest, shoulder angle), (iii) head angle data (e.g., straight, tilted to one side), (iv) eye gaze data (e.g., direction, bearing), (v) facial expression data (e.g., frowning, smiling, lip, mouth, eyebrow, eye, and/or cheek positioning data), and/or (vi) hand/arm data (e.g., hand/arm position and/or movement data—e.g., hand gesture data). In some embodiments, the audio data 244b may comprise data descriptive of various noises (e.g., environmental), sounds (e.g., speech), etc., of the user and/or the user's environment. The audio data 244b may be descriptive of, for example, one or more of a cadence, tone, volume, pitch, etc., of the user's speech. While not separately depicted, the input 216 may be received from one or more sensors of and/or associated with the user devices 202a-c, such as a camera, microphone, motion sensor, tracking and/or positioning device, etc. In some embodiments, the input 216 may be received (and/or otherwise identified) as part of a virtual conversation training process.

In some embodiments, the input 216 (one or more of the physical data 244a and the audio data 244b) may be transmitted to and/or received by the conversation training controller 210, which may process (e.g., utilizing the processing device 212) the input 216 utilizing one or more of the algorithms 242a-e (e.g., instruction sets, modules, and/or programmatic engines). A first phase of data processing may comprise, for example, a transcribing of the input 216 by a transcription module 242a (e.g., an execution of the transcription module 242a by the processing device 212). While the term "transcribe" is utilized to describe the first phase of processing for ease of reference, in some embodiments the first phase of processing may comprise any type of data processing that converts the input (or a portion thereof) into a different format or arrangement that is conducive to being searched, categorized, and/or analyzed. According to some embodiments, the transcription module 242a may convert the audio data 244b to textual and/or other human and/or machine-readable data. In some embodiments, the conversation training controller 210 may comprise and/or implement a second phase of processing that comprises execution of an AI intent module 242b (e.g., by the processing device 212). The AI intent module 242b may, for example, utilize the transcribed audio data 244b and/or the physical data 244a to compute an "intent" of the user (e.g., a human intent metric). In some embodiments, the AI intent module 242b may comprise a set of encoded AI instructions that are configured to classify the input 216 based on execution of a Machine Learning (ML) algorithm that has been trained to classify human conversational intents based on one or more training data sets (not shown). The AI intent module 242b may implement, for example, a Natural Language Processing (NLP) algorithm to identify specific words and/or phrases (e.g., from the transcribed version of the audio data 244b) and compare and match such words/phrases to stored words/phrases that are pre-related to various human intent elements.

According to some embodiments, the conversation training controller 210 may comprise and/or implement a third phase of processing that comprises execution (e.g., by the processing device 212) of an AI emotional (and/or conversational) state module 242c. The AI emotional state module 242c may, for example, utilize the transcribed audio data 244b, the physical data 244a, and/or the computed human intent to compute a state of the conversation and/or of an emotional parameter thereof. In some embodiments, the AI emotional state module 242c may comprise a set of encoded AI instructions that are configured to classify the input 216 and/or the human intent based on execution of a ML algorithm that has been trained to classify conversational and/or emotional states based on one or more training data sets (not shown). The AI emotional state module 242c may implement, for example, an intent classification algorithm to identify specific computed intents from the current conversation/input 216 and compare and match such intents to stored intents that are pre-related to various conversational and/or emotional states.

In some embodiments, the conversation training controller 210 may comprise and/or implement a fourth phase of processing that comprises execution (e.g., by the processing device 212) of an interface module 242d. The interface module 242d may, for example, utilize the computed conversational and/or emotional state of the conversation to identify, assemble, retrieve, generate, and/or output (e.g., as the output 218) one or more interface elements. The interface module 242d may comprise and/or access, for example, a conversational decision tree to identify one or more virtual conversational elements that are appropriate (e.g., pre-associated and/or assigned) based on the computed conversational and/or emotional state of the conversation. In some embodiments, the interface module 242d may utilize and/or generate one or more computer-generated and/or VR environments, objects, and/or avatars (and/or avatar characteristics or elements) to define interface data 244c as the output 218 that is transmitted to one or more of the user devices 202a-c. In such a manner, for example, the conversation training controller 210 may receive the input 216 (e.g., physical data 244a comprising hand positioning data from a VR controller of a third user device 202c, such as an Oculus® Quest 2™ available from Facebook Technologies, LLC of Menlo Park, CA), direct a virtual training conversation down a pre-programmed conversational path based upon the input 216, and produce and provide contextually-generated output 218 (e.g., via a display screen of a first user device 202a, such as a smart phone screen, and/or via a VR environment generated by the third user device 202c) to conduct a VR training session for the user(s). In some embodiments, the pre-programmed conversational path may be derived from and/or defined by a 3D AI decision-tree framework that is at least partially based on the computed conversational and/or emotional state of the conversation.

According to some embodiments, the conversation training controller 210 and/or the processing device 212 thereof may also or alternatively compute a score for the VR training conversation session. The conversation training controller 210 may comprise and/or implement, for example, a fifth phase of processing that comprises execution (e.g., by the processing device 212) of a scoring module 242e. The scoring module 242e may, for example, compute, identify, and/or derive one or more outcomes for the conversation based upon the particular path through the pre-programmed conversational path and/or AI decision-tree framework traversed in the current session, for example, as compared to one or more desired, ideal, and/or optimal paths (e.g., pre-defined traversal thresholds). In some embodiments, each conversational node along the path may be assigned a score or value and the individual scores/values may be utilized to calculate a total score for the conversation (e.g., summation, averaging, maximum, minimum, and/or other statistical and/or comparative mathematical metrics). According to some embodiments, one or more scores, ranks, standings, and/or results (e.g., derived from the one or more outcomes) may be utilized to define scoring data 244d that comprises the output 218 transmitted to one or more of the user devices 202a-c. In some embodiments, scoring data 244d may be computed (e.g., by the scoring module 242e) for each of the user devices 202a-c, and a user device 202a-c (and associated user) with the highest (or lowest) score may be ranked first and may be indicated as a winner. According to some embodiments, any user device 202a-c utilized to participate in a VR training conversation that is scored above a predetermined threshold value may be indicated as having achieved a particular training level, achievement, qualification, etc.

Fewer or more components 202a-c, 210, 212, 216, 218, 240, 242a-e, 244a-d and/or various configurations of the depicted components 202a-c, 210, 212, 216, 218, 240, 242a-e, 244a-d may be included in the system 200 without deviating from the scope of embodiments described herein. In some embodiments, the components 202a-c, 210, 212, 216, 218, 240, 242a-e, 244a-d may be similar in configuration and/or functionality to similarly named and/or numbered components as described herein. In some embodiments, the system 200 (and/or portions thereof) may comprise an AI-VR emotive conversation training system and/or a platform programmed and/or otherwise configured to execute, conduct, and/or facilitate the methods/algorithms 400, 500, 600, 900 of FIG. 4A, FIG. 4B, FIG. 5, FIG. 6, and/or FIG. 9 herein, and/or portions or combinations thereof.

Turning now to FIG. 3A and FIG. 3B, diagrams of a system 300 depicting a user device 302a-b providing instances of an example interface 320a-b according to some embodiments are shown. In some embodiments, the interfaces 320a-b may comprise a VR projection, web pages, web forms, database entry forms, API instances, spreadsheets, tables, and/or applications or other GUI instances via which a user may participate in an AI-VR emotive conversation training session, as described herein. The interfaces 320a-b may, for example, comprise a front-end of an AI-VR emotive conversation training program and/or platform programmed and/or otherwise configured to execute, conduct, and/or facilitate the methods/algorithms 400, 500, 600, 900 of FIG. 4A, FIG. 4B, FIG. 5, FIG. 6, and/or FIG. 9 herein, and/or portions or combinations thereof. In some embodiments, interfaces 320a-b may be output via a computerized device, such as the user device 302a-b, which may, for example, be similar in configuration to one or more of the user devices 102a-n, 202a-c of FIG. 1 and/or FIG. 2 herein. The interfaces 320a-b may, as depicted for example, comprise VR displays and/or renderings output via the user device 302a-b, which may comprise a VR headset display (although the Field-of-View (FoV) visible to a VR user (not shown) would be considerably more comprehensive than is capable of being replicated in the two-dimensional depictions in FIG. 3A and FIG. 3B).

According to some embodiments, the interfaces 320a-b may comprise one or more tabs and/or other segmented and/or logically-presented data forms and/or fields. In some embodiments, the interfaces 320a-b may be configured and/or organized to allow and/or facilitate input of human/user-originated conversational input and/or output of various aspects of a VR and/or otherwise computer-generated environment in which the virtual conversation takes place. According to some embodiments, a first version (or page, instance, orientation, view, and/or aspect) of the interface 320a as depicted in FIG. 3A may comprise a first view of a VR environment that comprises a first computer-generated and/or VR avatar 322a. The first computer-generated and/or VR avatar 322a may define, for example, a first instance and/or state of a VR customer, client, etc., with whom the user of the user device 302 conducts a conversation session (e.g., for training, as described herein), e.g., at a first time. According to some embodiments, a second version (or page, instance, orientation, view, and/or aspect) of the interface 320b as depicted in FIG. 3B may comprise a second view of a VR environment that comprises a second computer-generated and/or VR avatar 322b. The second computer-generated and/or VR avatar 322b may define, for example, a second instance and/or state of the VR customer, client, etc., with whom the user of the user device 302a-b conducts the conversation session, e.g., at a second and/or subsequent time.

In some embodiments, the VR avatar 322a-b may be generated utilizing and/or may comprise a plurality of virtual conversational elements. Virtual conversational elements may comprise, for example, various physical attributes and/or elements of the VR avatar 322a-b, such as mouth/lips/cheeks attributes 324a-b (e.g., a smile, frown, etc.), eye attributes 326a-b (e.g., a degree of openness (e.g., narrow, wide, closed), an eyebrow angle, etc.), hand/arm position attributes 328a-b, a position of the VR avatar 322a-b (e.g., defined by a virtual distance 332a-b from the user and/or an offset 334a-b from the center (e.g., center of eye orientation of the user) of the interfaces 320a-b), and/or a head tilt 336a-b (e.g., as measured by a difference between a vertical angle of the head of the VR avatar 322a-b and a vertical orientation/datum of the interfaces 320a-b). In some embodiments, the virtual conversational elements may comprise other VR environment objects, attributes, characteristics, and/or features, such as a tree 338a and/or a building 338b situated in the environment. According to some embodiments, virtual conversational elements may also or additionally comprise multimedia elements, such as audio (e.g., sounds, speech), video, animation, and/or scents/smells.

According to some embodiments, any or all of the virtual conversational elements 324a-b, 326a-b, 328a-b, 332a-b, 334a-b, 336a-b, 338a-b may be generated, rendered, and/or output (e.g., via the respective interfaces 320a-b) in accordance with a path, plan, schedule, and/or other pre-programmed definition of the virtual conversation (or a portion thereof). The first interface 320a may output the first VR avatar 322a comprising elements/attributes 324a, 326a, 328a that are indicative and/or descriptive of a customer that is in a pleasant mood (e.g., a first emotional state). The first VR avatar 322a may comprise a first mouth/lips/cheek attribute 324a indicative of a pleasant and/or happy expression (e.g., lips forming a smile, mouth closed, etc.), for example, may comprise a first eye attribute 326a indictive of a calm or pleased expression (e.g., eyes wide open and eyebrows at a resting or natural angle), and/or may comprise a first hand/arm position attribute 328a indicative of a relaxed or happy demeanor (e.g., relaxed shoulders, arms by the side, etc.). The first VR avatar 322a may also or alternatively be positioned at a first virtual distance 332a that falls within a predefined range of 'acceptable', 'normal', or 'friendly' human interaction thresholds (e.g., not so far as to be distant or aloof, yet not too close so as to violate the personal space of the user; virtually), for example, and/or may exhibit a first head tilt 336a within a range of angles indicative of a curious, pleased, relaxed, and/or otherwise happy customer/client/etc.

In some embodiments, the user may provide and/or define input (e.g., audio/speech, joystick input, keyboard input, body movement input, etc.) in response to the outputting of the first interface 320a. According to some embodiments, the user input may be utilized to generate the second VR avatar 322b and/or a second environment output via the second interface 320b. In some embodiments, such as in the non-limiting example depicted in FIG. 3B, the user input may have been computed to have angered the customer/client and various attributes of the second VR avatar 322b may be selected and output to indicate this second emotional state. The second VR avatar 322b may comprise elements/attributes 324b, 326b, 328b, 332b, 334b, 336b that are indicative and/or descriptive of a customer that is angry. The second VR avatar 322b may, for example, comprise a second mouth/lips/cheek attribute 324b indicative of an angry expression (e.g., lips forming a frown, mouth open and/or teeth bared, etc.), for example, may comprise a second eye attribute 326b indicative of an angry expression (e.g., eyes narrowed and eyebrows at an inward/downward angle), and/or may comprise a second hand/arm position attribute 328b indicative of a confrontational or even combative demeanor (e.g., a raised fist, squared-off shoulders, etc.). The second VR avatar 322b may also or alternatively be positioned at a second virtual distance 332b that falls within a predefined range of 'intimidating', 'confrontational', or 'unfriendly' human interaction thresholds (e.g., close enough to violate the personal space of the user; virtually), for example, and/or may exhibit a second head tilt 336*b* within a range of angles indicative of an angry, aggressive, confrontational, and/or otherwise unhappy customer/client/ etc.

According to some embodiments, first and second offsets 334*a-b* of the VR avatar 322*a-b* from the center (e.g., center of eye orientation of the user) of the interfaces 320*a-b* may be indicative of either or both of an attribute of the user (e.g., user input) or emotional state output. In the example simulated conversation session of FIG. 3A and FIG. 3B, for example, a first offset 334*a* may indicate that the user is not looking directly at the first VR avatar 322*a*. This data may be utilized (at least in part) to determine that, for example, such a passive or low confidence act on the part of the user (e.g., lack of eye contact) may anger or embolden the VR avatar 322*a-b*. Accordingly, the second VR avatar 322*b* may be output in the second/angry/aggressive emotional state as depicted. In some embodiments, a second offset 334*b* of the second VR avatar 322*b* may indicate (i) that the user has shifted their gaze/eye focus toward the second VR avatar 322*b* and/or (ii) that the second VR avatar 322*b* has moved closer to the user in the VR environment. The second offset 334*b* and/or the second virtual distance 332*b* may, for example, be less than the respective first offset 334*a* and the first virtual distance 332*a*.

Fewer or more components 302*a-b*, 320*a-b*, 322*a-b*, 324*a-b*, 326*a-b*, 328*a-b*, 332*a-b*, 334*a-b*, 336*a-b*, 338*a-b* and/or various configurations of the depicted components 302*a-b*, 320*a-b*, 322*a-b*, 324*a-b*, 326*a-b*, 328*a-b*, 332*a-b*, 334*a-b*, 336*a-b*, 338*a-b* may be included in the system 300 without deviating from the scope of embodiments described herein. In some embodiments, the components 302*a-b*, 320*a-b*, 322*a-b*, 324*a-b*, 326*a-b*, 328*a-b*, 332*a-b*, 334*a-b*, 336*a-b*, 338*a-b* may be similar in configuration and/or functionality to similarly named and/or numbered components as described herein. In some embodiments, the system 300 (and/or portions thereof) may comprise an AI-VR emotive conversation training system and/or a platform programmed and/or otherwise configured to execute, conduct, and/or facilitate the methods/algorithms 400, 500, 600, 900 of FIG. 4A, FIG. 4B, FIG. 5, FIG. 6, and/or FIG. 9 herein, and/or portions or combinations thereof.

While various components of the interfaces 320*a-b* have been depicted with respect to certain graphical objects, labels, layouts, headings, titles, and/or configurations, these features have been presented for reference and example only. Other graphical objects, labels, layouts, headings, titles, and/or configurations may be implemented without deviating from the scope of embodiments herein. Similarly, while a certain number of tabs, information screens, form fields, and/or data entry options may be presented and/or inferred, variations thereof may be practiced in accordance with some embodiments.

Figure 7:
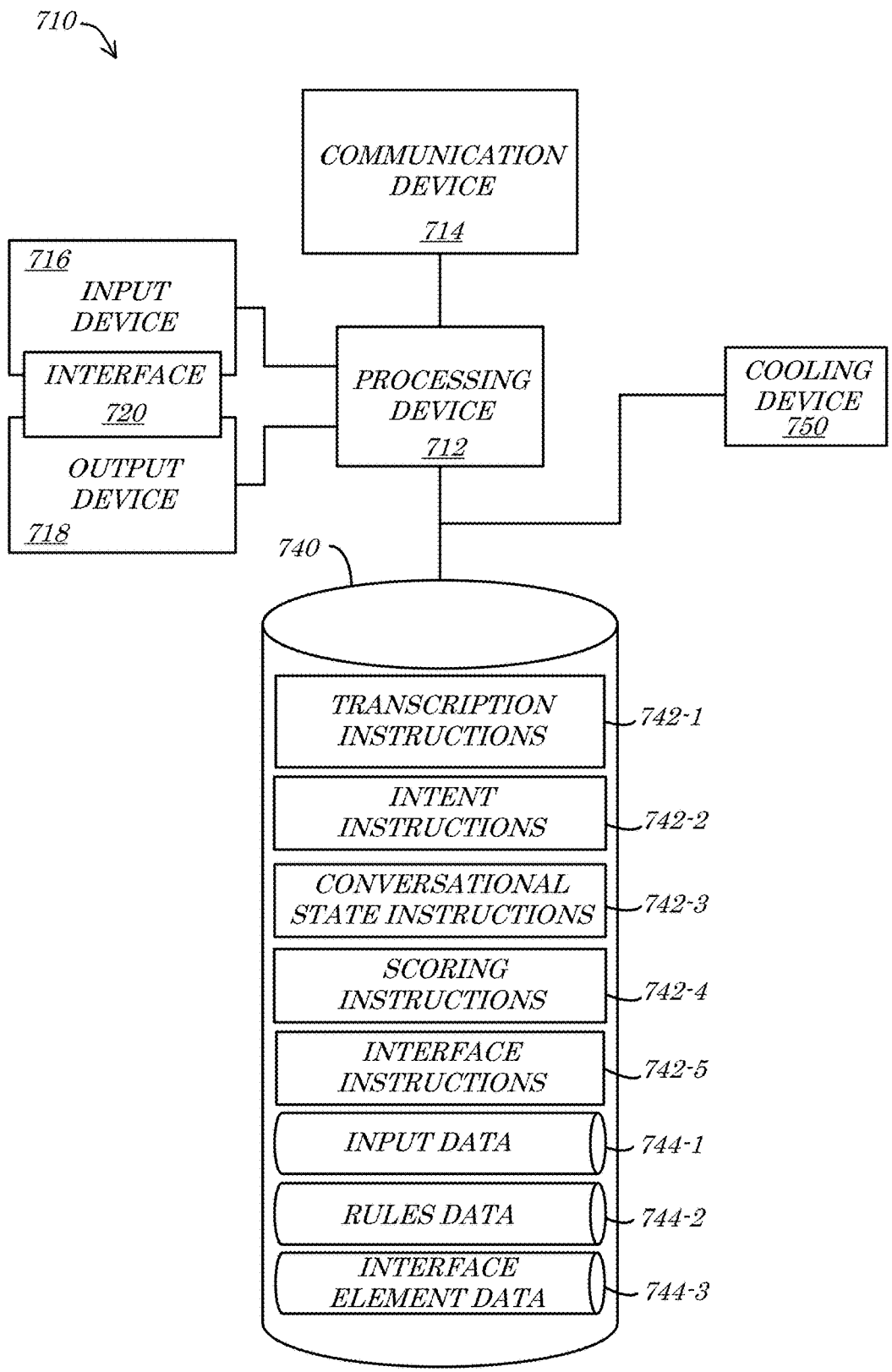
FIG. 7 is a block diagram of an apparatus according to some embodiments.
Figure 8A:
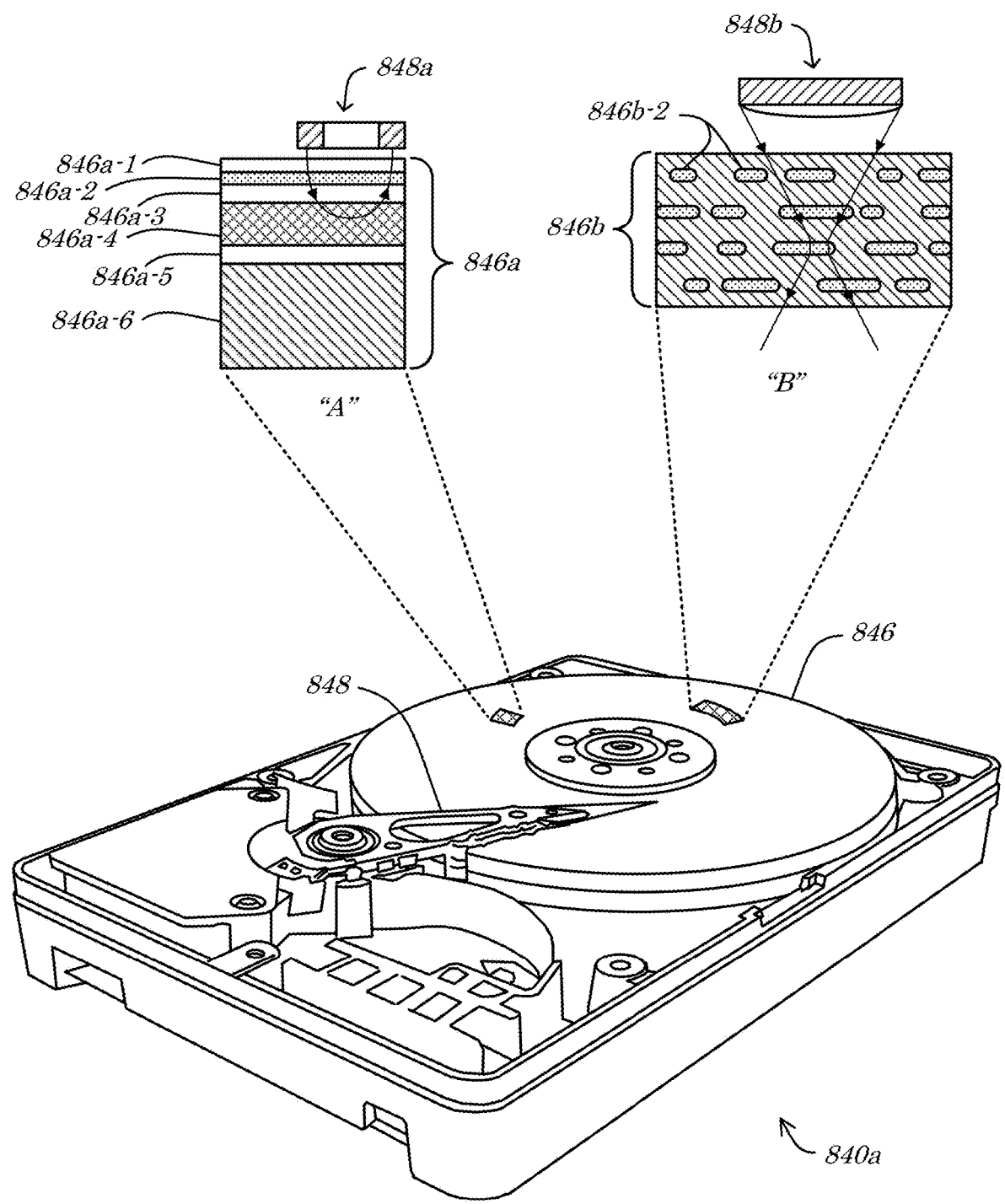
FIG. 8A, FIG. 8B, FIG. 8C, FIG. 8D, and FIG. 8E are perspective diagrams of exemplary data storage devices according to some embodiments.
Figure 8B:
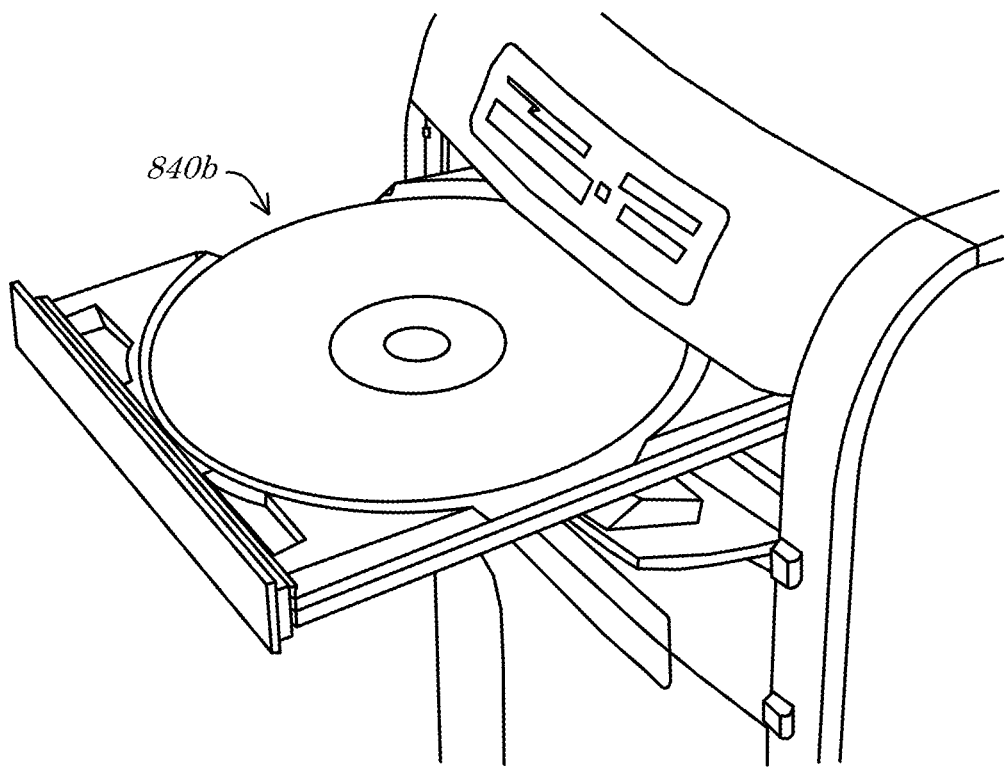
Figure 8C:
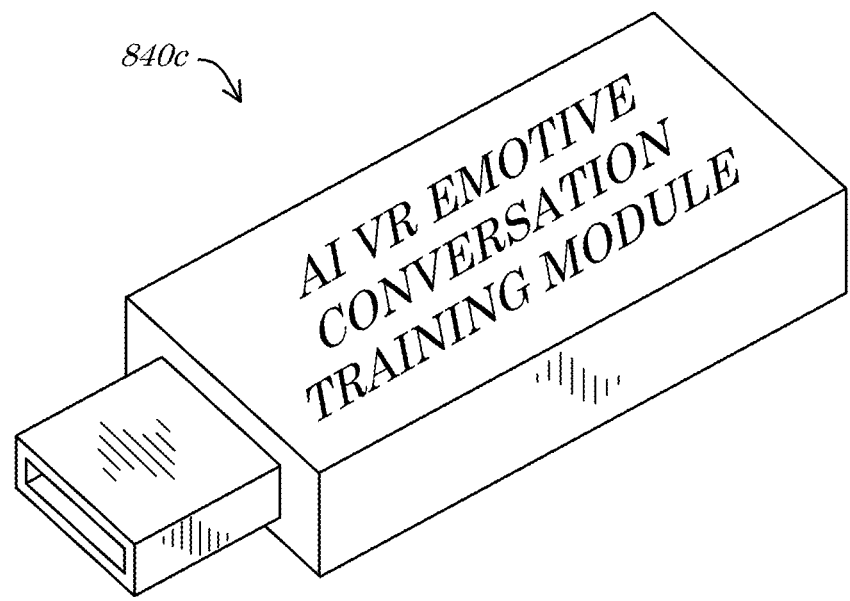
Figure 8D:
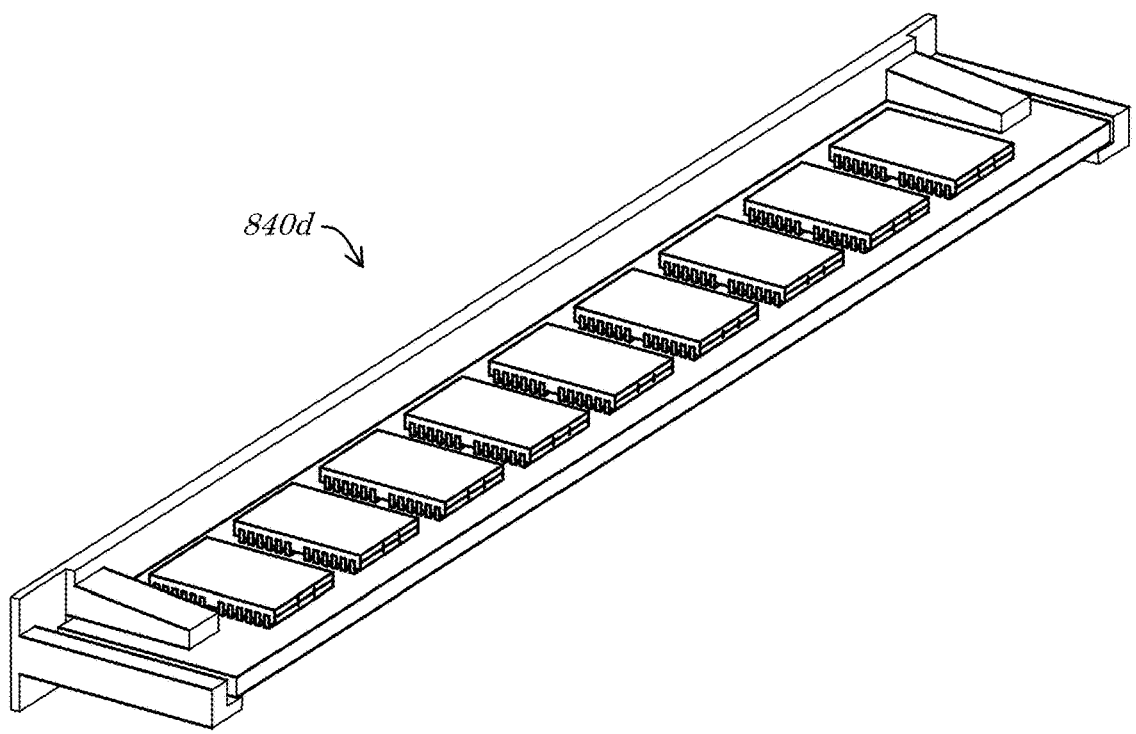
Figure 8E:
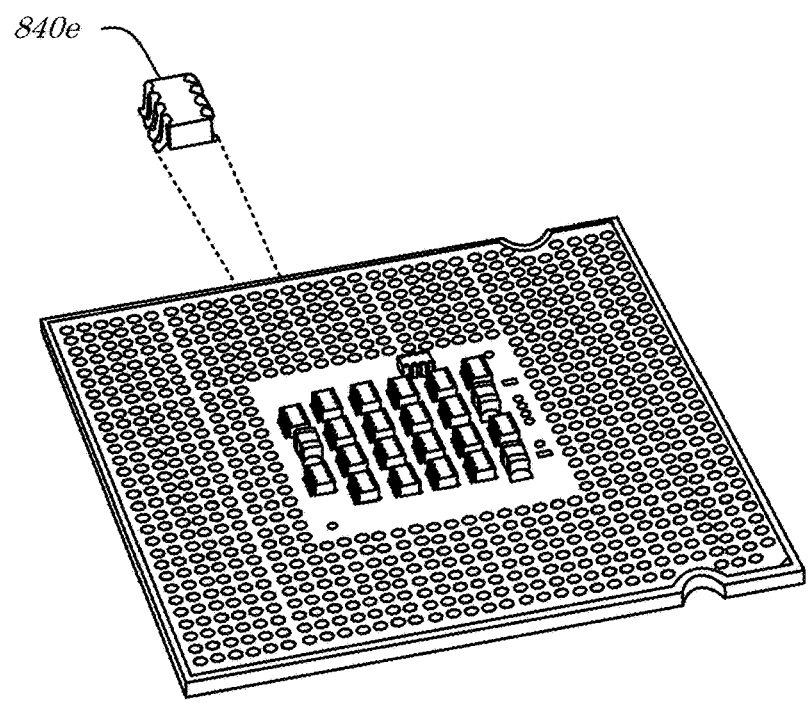

III. Artificial Intelligence (AI) Virtual Reality (VR) Emotive Conversation Training Methods Referring now to FIG. 4A and FIG. 4B, flow diagrams of a method 400 according to some embodiments are shown. In some embodiments, the method 400 may be performed and/or implemented by and/or otherwise associated with one or more specialized and/or specially-programmed computers (e.g., one or more of the user devices 102*a-n*, 202*a-c*, 302*a-b*, third-party device 106, the controller device 110, 210 and/or the apparatus 710 of FIG. 1, FIG. 2, FIG. 3A, FIG. 3B, and/or FIG. 7 herein), computer terminals, computer servers, computer systems and/or networks, and/or any combinations thereof (e.g., by one or more multi-threaded and/or multi-core processing units of an AI-VR emotive conversation training system). In some embodiments, the method 400 may be embodied in, facilitated by, and/or otherwise associated with various input mechanisms and/or interfaces (such as the interfaces 320*a-b*, 720 of FIG. 3A, FIG. 3B, and/or FIG. 7 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240, 740, 840*a-e*, 940 of FIG. 1, FIG. 2, FIG. 7, FIG. 8A, FIG. 8B, FIG. 8C, FIG. 8D, FIG. 8E, and/or FIG. 9 herein) may store thereon instructions that when executed by a machine (such as a computerized processor) result in performance according to any one or more of the embodiments described herein.

In some embodiments, the method 400 may operate upon and/or be triggered by an identification and/or receipt of user-defined input from a remote and/or mobile user device (not shown; e.g., the user devices 102*a-n*, 202*a-c*, 302*a-b* of FIG. 1, FIG. 2, FIG. 3A, and/or FIG. 3B herein) as part of a simulated emotive conversational training session. The method 400 may initiate, with respect to a non-limiting example of an insurance claim handling process, for example, upon receiving an indication that a claim inspection results in a determination of no covered damage (e.g., hail damage), at 402. In some embodiments, the method 400 may comprise a representation of a predefined and/or pre-programmed emotively responsive and dynamic feedback pathway or conversational path that provides a basis for conducting and advancing the simulated training conversation. The method 400 may proceed to a first node 404, for example, where a user (e.g., an insurance claim representative in the example case) provides/defines (and/or an electronic training system receives) a spoken statement, such as "Hello, my inspection is complete. It looks like there is no hail damage."

Figure 4A:
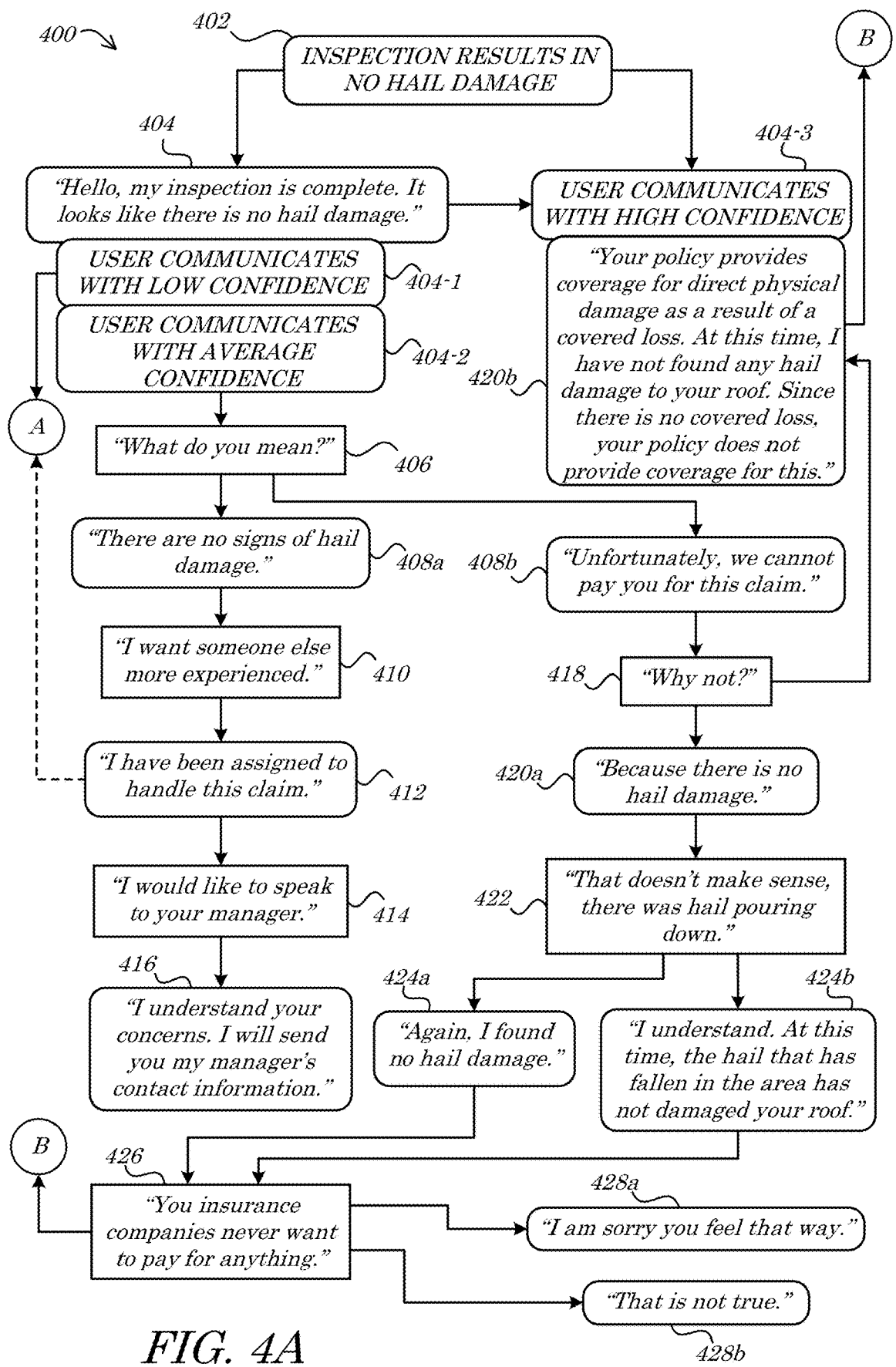
FIG. 4A and FIG. 4B are flow diagrams of a method according to some embodiments.

According to some embodiments, the input (i.e., the spoken sentence of the user) may be analyzed to determine which path the simulated conversation should take and/or which subsequent conversational node should be activated and/or progressed to. In some embodiments, attributes of the spoken sentence (e.g., a tone, pitch, cadence, timing, volume) and/or other input (e.g., the user's position in the virtual environment, the bearing or direction of the user's actual or virtual gaze, arm movements (e.g., gesturing) of the user) may be utilized to select, identify, and/or otherwise determine the path and/or next node. As depicted in FIG. 4A, for example, the user's spoken statement (i.e., the first node) at 404 may be categorized as either having been communicated/delivered with "low" confidence 404-1, "medium" (e.g., average) confidence 404-2, or "high" confidence 404-3 (e.g., categorized based on a confidence metric and predefined qualitative ranges for values of the metric). In some embodiments, in the case that it is determined that the user communicated with low confidence at 404-1, the method 400 may proceed (e.g., in accordance with an identified path, direction, and/or next node) to "A", which is described with respect to FIG. 4B below. In the case that it is determined that the user communicated with medium or average confidence at 404-2, the method 400 may proceed (e.g., in accordance with the identified path, direction, and/or next node) to provide a first conversational response at a second node 406. The second node 406 may comprise, for example, audio (with video, animation, and/or other associated output) of "What do you mean?" (e.g., spoken by a VR avatar, or a first representation or version thereof).

In some embodiments, the user may respond to the output of the second node 406 by providing/defining (and/or by the processing system receiving) a third node 408*a-b* having one or more variants, such as a first response 408*a* or a second response 408*b*. The first response 408*a* may comprise, for example, a spoken statement, such as "There are no signs of hail damage," and/or the second response 408*b* may comprise a spoken statement, such as "Unfortunately, we cannot pay you for this claim." According to some embodiments, the different responses 408*a-b* may be classified based on emotive and/or intent classification. The first response 408*a* may comprise a more gruff or to-the-point response based on the spoken words (and delivery thereof) provided by the user and may accordingly be classified as a first intent and/or first emotive state of the user and/or conversation, for example, while the second response 408*b* may comprise a more friendly or gentle response based on the spoken words (and delivery thereof) provided by the user and may accordingly be classified as a second intent and/or second emotive state of the user and/or conversation. In some embodiments, the first intent and/or emotive state may direct the path of the conversation to a fourth node 410. The fourth node 410 may comprise, for example, audio (with video, animation, and/or other associated output) of "I want someone else more experienced" (e.g., spoken by the VR avatar, or a second representation or version thereof). In some embodiments, the user may respond to the output of the fourth node 410 by providing/defining (and/or by the processing system receiving) a fifth node 412. The fifth node 412 may comprise, for example, a spoken statement such as "I have been assigned to handle this claim." In some embodiments, there may be no alternative paths, path branches, and/or nodes and the method 400 may proceed to a sixth node 414 that may comprise, for example, audio (with video, animation, and/or other associated output) of "I would like to speak to your manager" (e.g., spoken by a VR avatar, or a third representation or version thereof).

According to some embodiments, the user may be able to (or may be forced to) switch conversational paths based on an analysis of various input variables and/or attributes, e.g., defining a current emotive and/or conversational state of the conversation. In the case that each user node 404, 408*a*, 412 along the current path is assigned a specific amount of points, for example, in the case that the cumulated (e.g., summed) point total along the path reaches a predefined threshold, the path may deviate and/or be switched, e.g., in accordance with the dotted line in FIG. 4A to "A". In such an example situation, while the current path may have been characterized as a medium or average confidence path, the user's responses and/or actions (or lack of action) may trigger (e.g., based on a reaching or exceeding of a numeric scoring threshold) a switch to "A", which may be characterized as a low confidence path. Similarly, while not depicted, the user may be switched to a higher confidence path (e.g., upon exhibiting higher-confidence attributes). In some embodiments, such as in the case that the user stays on the current path, the user may respond to the output of the sixth node 414 by providing/defining (and/or by the processing system receiving) a seventh node 416. The seventh node 416 may comprise, for example, a spoken statement, such as "I understand your concerns. I will send you my manager's contact information." In some embodiments, the seventh node 416 may comprise an end of a current conversational path (e.g., there are no additional downstream nodes) and may accordingly comprise a conversational outcome (e.g., associated with and/or defining a final and/or total score for the user's virtual emotive conversation training session).

According to some embodiments, and with reference back to the second response 408*b*, the second intent and/or emotive state may direct the path of the conversation to an eighth node 418. The eighth node 418 may comprise, for example, audio (with video, animation, and/or other associated output) of "Why not?" (e.g., spoken by the VR avatar, or a fourth representation or version thereof). In some embodiments, the user may respond to the output of the eighth node 418 by providing/defining (and/or by the processing system receiving) a ninth node 420*a-b* having one or more variants, such as a third response 420*a* or a fourth response 420*b*. The third response 420*a* may comprise, for example, a spoken statement, such as "Because there is no hail damage," and/or the fourth response 420*b* may comprise a spoken statement such as "Your policy provides coverage for direct physical damage as a result of a covered loss. At this time, I have not found any hail damage to your roof. Since there is no covered loss, your policy does not provide coverage for this." According to some embodiments, the different responses 420*a-b* may be classified based on emotive and/or intent classification. The third response 420*a* may comprise a simpler or less explanatory response based on the spoken words (and delivery thereof) provided by the user and may accordingly be classified as a third intent and/or third emotive state of the user and/or conversation, for example, while the fourth response 420*b* may comprise a more comprehensive or detailed response based on the spoken words (and delivery thereof) provided by the user and may accordingly be classified as a fourth intent and/or fourth emotive state of the user and/or conversation. In some embodiments, the third intent and/or emotive state may continue to direct the path of the conversation in the same "direction" to a tenth node 422. The tenth node 422 may comprise, for example, audio (with video, animation, and/or other associated output) of "That doesn't make sense, there was hail pouring down" (e.g., spoken by the VR avatar, or a fifth representation or version thereof).

In some embodiments, the user may respond to the output of the tenth node 422 by providing/defining (and/or by the processing system receiving) an eleventh node 424*a-b* having one or more variants, such as a fifth response 424*a* or a sixth response 424*b*. The fifth response 424*a* may comprise, for example, a spoken statement, such as "Again, I found no hail damage," and/or the sixth response 424*b* may comprise a spoken statement, such as "I understand. At this time, the hail that has fallen in the area has not damaged your roof." According to some embodiments, the different responses 424*a-b* may be classified based on emotive and/or intent classification. The fifth response 424a may comprise a simpler or less explanatory response based on the spoken words (and delivery thereof) provided by the user and may accordingly be classified as a fifth intent and/or fifth emotive state of the user and/or conversation, for example, while the sixth response 424b may comprise a more comprehensive or explanatory response based on the spoken words (and delivery thereof) provided by the user and may accordingly be classified as a sixth intent and/or sixth emotive state of the user and/or conversation. In some embodiments, each of the fifth and sixth intents and/or emotive states may continue to direct the path of the conversation in the same "direction" to a twelfth node 426. Despite the same destination (e.g., next node) for the paths of the different responses 424a-b, in some embodiments different users' providing the different responses 424a-b (or the same user during different sessions) may be scored differently. Each node may be assigned and/or comprise a different amount of points, for example.

According to some embodiments, the twelfth node 426 may comprise audio (with video, animation, and/or other associated output) of "You insurance companies never want to pay for anything" (e.g., spoken by a VR avatar, or a sixth representation or version thereof). In some embodiments, the user may respond to the output of the twelfth node 426 by providing/defining (and/or by the processing system receiving) a thirteenth node 428a-b having one or more variants, such as a seventh response 428a or an eighth response 428b. The seventh response 428a may comprise, for example, a spoken statement, such as "I am sorry you feel that way," and/or the eighth response 428b may comprise a spoken statement, such as "That is not true." According to some embodiments, the different responses 428a-b may be classified based on emotive and/or intent classification. The seventh response 428a may comprise a more friendly or compassionate response based on the spoken words (and delivery thereof) provided by the user and may accordingly be classified as a seventh intent and/or seventh emotive state of the user and/or conversation, for example, while the eighth response 428b may comprise a more combative response based on the spoken words (and delivery thereof) provided by the user and may accordingly be classified as an eighth intent and/or eighth emotive state of the user and/or conversation.

In some embodiments, the thirteenth node 428a-b and/or the seventh response 428a and/or the eighth response 428b thereof may comprise an end of a current conversational path (e.g., there are no additional downstream nodes) and may accordingly comprise a conversational outcome (e.g., associated with and/or defining a final and/or total score for the user's virtual emotive conversation training session). According to some embodiments, the user may provide a different response (and/or no response) and/or input and the method 400 may proceed from the twelfth node 426 (e.g., in accordance with an identified path, direction, and/or next node) to "B", which is described with respect to FIG. 4B below. According to some embodiments, and with reference back to the fourth response 420b, the fourth intent and/or emotive state may direct the path of the conversation to "B". In some embodiments, and with reference back to the first node 404, in the case that it is determined that the user communicated with high confidence at 404-3, the method 400 may proceed (e.g., in accordance with the identified path, direction, and/or next node) to "B".

Figure 4B:
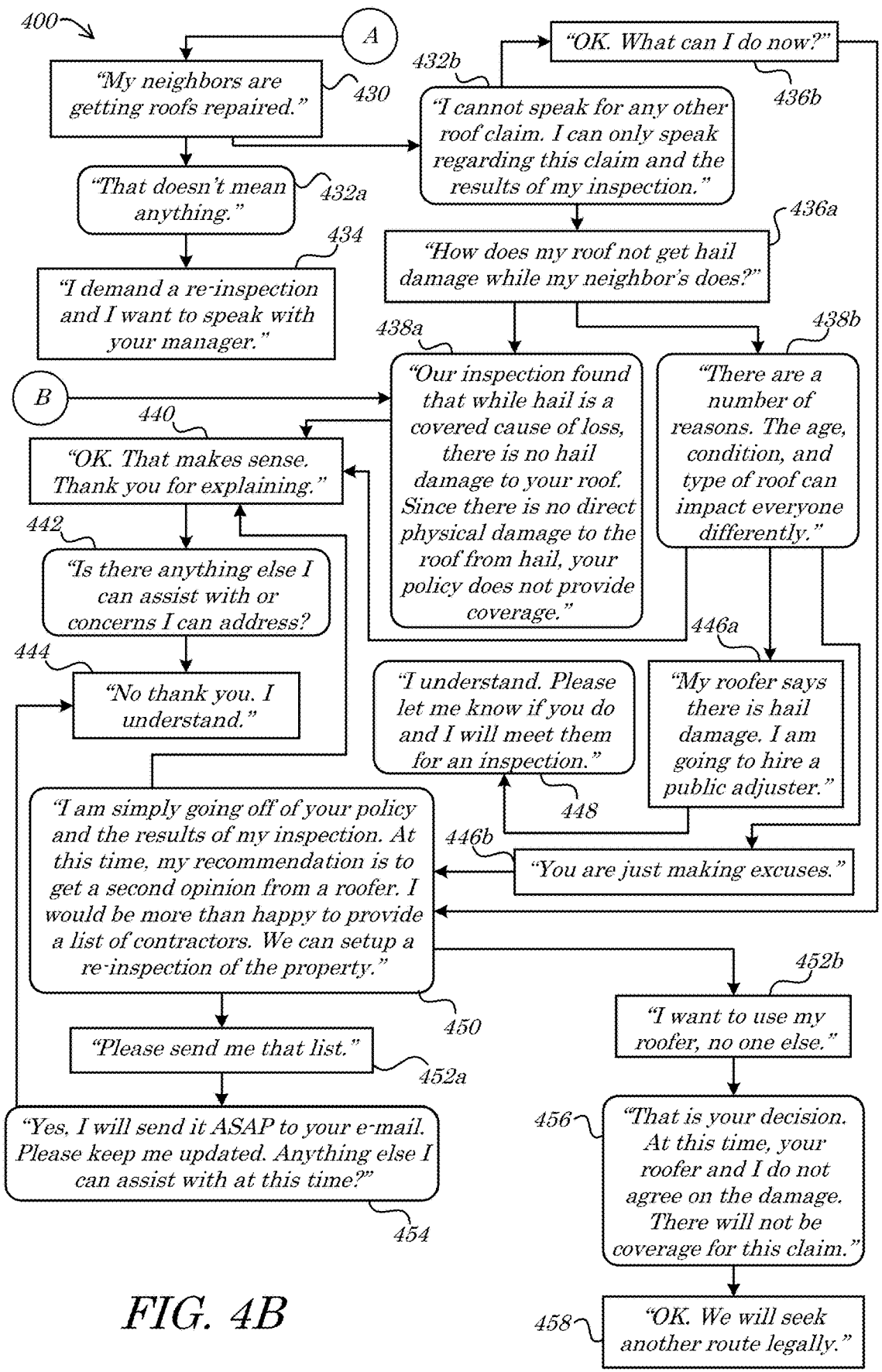

With reference to FIG. 4B, the method 400 (as noted above), may proceed to "A", from which it may further proceed to a fourteenth node 430. In some embodiments, the fourteenth node 430 may comprise audio (with video, animation, and/or other associated output) of "My neighbors are getting roofs repaired" (e.g., spoken by a VR avatar, or a seventh representation or version thereof). In some embodiments, the user may respond to the output of the fourteenth node 430 by providing/defining (and/or by the processing system receiving) a fifteenth node 432a-b having one or more variants, such as a ninth response 432a or a tenth response 432b. The ninth response 432a may comprise, for example, a spoken statement, such as "That doesn't mean anything," and/or the tenth response 432b may comprise a spoken statement, such as "I cannot speak for any other roof claim. I can only speak regarding this claim and the results of my inspection." According to some embodiments, the different responses 432a-b may be classified based on emotive and/or intent classification. The ninth response 432a may comprise a simple or unhelpful response based on the spoken words (and delivery thereof) provided by the user and may accordingly be classified as a ninth intent and/or ninth emotive state of the user and/or conversation, for example, while the tenth response 432b may comprise a more professional or detailed response based on the spoken words (and delivery thereof) provided by the user and may accordingly be classified as a tenth intent and/or tenth emotive state of the user and/or conversation. In some embodiments, the ninth intent and/or emotive state may cause the method 400 to proceed down a path to a sixteenth node 434.

According to some embodiments, the sixteenth node 434 may comprise audio (with video, animation, and/or other associated output) of "I demand a re-inspection and I want to speak with your manager" (e.g., spoken by a VR avatar, or an eighth representation or version thereof). In some embodiments, the sixteenth node 434 may comprise an end of a current conversational path (e.g., there are no additional downstream nodes) and may accordingly comprise a conversational outcome (e.g., associated with and/or defining a final and/or total score for the user's virtual emotive conversation training session). According to some embodiments, and with reference back to the tenth response 432b, the tenth intent and/or emotive state may direct the path of the conversation to a seventeenth node 436a-b. In some embodiments, the seventeenth node 436a-b may comprise a first output version 436a and/or a second output version 436b (or more versions). The first output version 436a may comprise, for example, audio (with video, animation, and/or other associated output) of "How does my roof not get hail damage while my neighbor's does?" (e.g., spoken by a VR avatar, or a ninth representation or version thereof) and/or the second output version 436b may comprise audio (with video, animation, and/or other associated output) of "OK. What can I do now?" (e.g., spoken by a VR avatar, or a tenth representation or version thereof).

In some embodiments, the seventeenth node 436a-b may comprise, for example, a pre-programmed path branch or junction. According to some embodiments, whether the first output version 436a or the second output version 436b is output to the user may be based upon various computational factors, such as a current score of the user/conversation, a current emotive state of the user, virtual client/customer, and/or of the overall conversation, and/or an elapsed time of the virtual conversation. In the case that the user's score is below a threshold and/or the conversation to this point has taken more than a threshold amount of time (in either case perhaps indicating that the user has not performed well), for example, the method 400 may proceed down a path to the first output version 436a (e.g., which may comprise a more negative emotive path). In some embodiments, the path and corresponding one of the first output version 436*a* and the second output version 436*b* may be selected or chosen randomly, in-turn/round-robin, and/or via other selection methods that are or become known or practicable.

According to some embodiments, the user may respond to the output of the seventeenth node 436*a-b* by providing/ defining (and/or by the processing system receiving) an eighteenth node 438*a-b* having one or more variants, such as an eleventh response 438*a* or a twelfth response 438*b*. The eleventh response 438*a* may comprise, for example, a spoken statement, such as "Our inspection found that while hail is a covered cause of loss, there is no hail damage to your roof. Since there is no direct physical damage to the roof from hail, your policy does not provide coverage," and/or the twelfth response 438*b* may comprise a spoken statement, such as "There are a number of reasons. The age, condition, and type of roof can impact everyone differently." According to some embodiments, the different responses 438*a-b* may be classified based on emotive and/or intent classification. The eleventh response 438*a* may provide a more detailed response based on the spoken words (and delivery thereof) provided by the user and may accordingly be classified as an eleventh intent and/or eleventh emotive state of the user and/or conversation, for example, while the twelfth response 438*b* may comprise a less detailed response based on the spoken words (and delivery thereof) provided by the user and may accordingly be classified as a twelfth intent and/or twelfth emotive state of the user and/or conversation. According to some embodiments, the eighteenth node 438*a-b* may be provided/defined as part of a traversal of the method 400 along a path from "B" (e.g., from FIG. 4A). In some embodiments, either or both of the eleventh and twelfth intents and/or emotive states may direct the path of the conversation in the same "direction" to a nineteenth node 440. In some embodiments, only the eleventh intent and/or emotive state may direct the path of the conversation to the nineteenth node 440 or the path may be dynamically selected based on conversational metrics, such as current emotive state, current score, elapsed time, etc.

In some embodiments, the nineteenth node 440 may comprise audio (with video, animation, and/or other associated output) of "OK. That makes sense. Thank you for explaining" (e.g., spoken by a VR avatar, or an eleventh representation or version thereof). In some embodiments, the user may respond to the output of the nineteenth node 440 by providing/defining (and/or by the processing system receiving) a twentieth node 442. The twentieth node 442 may comprise, for example, a spoken statement such as "Is there anything else I can assist with or concerns I can address?". In some embodiments, there may be no alternative paths, path branches, and/or nodes and the method 400 may proceed to a twenty-first node 444 that may comprise, for example, audio (with video, animation, and/or other associated output) of "No thank you. I understand" (e.g., spoken by a VR avatar, or a twelfth representation or version thereof). In some embodiments, the twenty-first node 444 may comprise an end of a current conversational path (e.g., there are no additional downstream nodes) and may accordingly comprise a conversational outcome (e.g., associated with and/or defining a final and/or total score for the user's virtual emotive conversation training session). In some embodiments, as depicted in the ongoing example, the twenty-first node 444 may comprise the highest scoring and/or most ideal (e.g., target) node for the conversation— e.g., the customer/client is satisfied. According to some embodiments, one or more paths taken to arrive at the twenty-first node 444 may comprise an "ideal" or target path from which path deviations are scored to arrive at an overall score or rank for the virtual emotive conversation training session.

According to some embodiments, and with reference back to the twelfth response 438*b*, the twelfth intent and/or emotive state may direct the path of the conversation to either the nineteenth node 440 or to a twenty-second node 446*a-b*. In some embodiments, the twenty-second node 446*a-b* may comprise a third output version 446*a* and/or a fourth output version 446*b* (or more versions). The third output version 446*a* may comprise, for example, audio (with video, animation, and/or other associated output) of "My roofer says there is hail damage. I am going to hire a public adjuster" (e.g., spoken by a VR avatar, or a thirteenth representation or version thereof) and/or the fourth output version 446*b* may comprise audio (with video, animation, and/or other associated output) of "You are just making excuses" (e.g., spoken by a VR avatar, or a fourteenth representation or version thereof).

In some embodiments, the twenty-second node 446*a-b* may comprise, for example, a pre-programmed path branch or junction. According to some embodiments, whether the third output version 446*a* or the fourth output version 446*b* is output to the user may be based upon various computational factors, such as a current score of the user/conversation, a current emotive state of the user, virtual client/ customer, and/or of the overall conversation, and/or an elapsed time of the virtual conversation. In the case that the user's score is below a threshold and/or the conversation to this point has taken more than a threshold amount of time (in either case perhaps indicating that the user has not performed well), for example, the method 400 may proceed down a path to the fourth output version 446*b* (e.g., which may comprise a more negative emotive path). In some embodiments, the path and corresponding one of the third output version 446*a* or the fourth output version 446*b* may be selected or chosen randomly, in-turn/round-robin, and/or via other selection methods that are or become known or practicable.

According to some embodiments, the user may respond to the output of the twenty-second node 446*a-b* by providing/ defining (and/or by the processing system receiving) a twenty-third node 448. The twenty-third node 448 may comprise, for example, a spoken statement, such as "I understand. Please let me know if you do and I will meet them for an inspection." In some embodiments, the twenty-third node 448 may comprise an end of a current conversational path (e.g., there are no additional downstream nodes) and may accordingly comprise a conversational outcome (e.g., associated with and/or defining a final and/or total score for the user's virtual emotive conversation training session).

According to some embodiments, and with reference back to the twenty-second node 446*a-b*, the user may respond to the output of the fourth output version 446*b* by providing/ defining (and/or by the processing system receiving) a twenty-fourth node 450. The twenty-fourth node 450 may comprise, for example, a spoken statement, such as "I am simply going off of your policy and the results of my inspection. At this time, my recommendation is to get a second opinion from a roofer. I would be more than happy to provide a list of contractors. We can setup a re-inspection of the property." According to some embodiments, the twenty-fourth node 450 may be provided/defined as a response to the second output version 436*b* of the seventeenth node 436*a-b*. In some embodiments, the method 400 may direct the conversational path to either the nineteenth node 440 or to a twenty-fifth node 452a-b. In some embodiments, the twenty-fifth node 452a-b may comprise a fifth output version 452a and/or a sixth output version 452b (or more versions). The fifth output version 452a may comprise, for example, audio (with video, animation, and/or other associated output) of "Please send me that list" (e.g., spoken by a VR avatar, or a fifteenth representation or version thereof) and/or the sixth output version 452b may comprise audio (with video, animation, and/or other associated output) of "I want to use my roofer, no one else" (e.g., spoken by a VR avatar, or a sixteenth representation or version thereof).

In some embodiments, the twenty-fifth node 452a-b may comprise, for example, a pre-programmed path branch or junction. According to some embodiments, whether the fifth output version 452a or the sixth output version 452b is output to the user may be based upon various computational factors, such as a current score of the user/conversation, a current emotive state of the user, virtual client/customer, and/or of the overall conversation, and/or an elapsed time of the virtual conversation. In the case that the user's score is below a threshold and/or the conversation to this point has taken more than a threshold amount of time (in either case perhaps indicating that the user has not performed well), for example, the method 400 may proceed down a path to the sixth output version 452b (e.g., which may comprise a more negative emotive path). In some embodiments, the path and corresponding one of the fifth output version 452a or the sixth output version 452b may be selected or chosen randomly, in-turn/round-robin, and/or via other selection methods that are or become known or practicable.

According to some embodiments, the user may respond to the output of the fifth output version 452a of the twenty-fifth node 452a-b by providing/defining (and/or by the processing system receiving) a twenty-sixth node 454. The twenty-sixth node 454 may comprise, for example, a spoken statement such as "Yes, I will send it ASAP to your e-mail. Please keep me updated. Anything else I can assist with at this time?" In some embodiments, there may be no alternative paths, path branches, and/or nodes and the method 400 may proceed to the twenty-first node 444, e.g., which may comprise a conversation outcome node (e.g., an endpoint of the virtual conversation).

According to some embodiments, and with reference back to the twenty-fifth node 452a-b, the user may respond to the output of the sixth output version 452b by providing/defining (and/or by the processing system receiving) a twenty-seventh node 456. The twenty-seventh node 456 may comprise, for example, a spoken statement, such as "That is your decision. At this time, your roofer and I do not agree on the damage. There will not be coverage for this claim." In some embodiments, the method 400 may direct the conversational path to a twenty-eighth node 458. In some embodiments, the twenty-eighth node 458 may comprise audio (with video, animation, and/or other associated output) of "OK. We will seek another route legally" (e.g., spoken by a VR avatar, or a seventeenth representation or version thereof). In some embodiments, the twenty-eighth node 458 may comprise an end of a current conversational path (e.g., there are no additional downstream nodes) and may accordingly comprise a conversational outcome (e.g., associated with and/or defining a final and/or total score for the user's virtual emotive conversation training session). In some embodiments, as depicted in the ongoing example, the twenty-eighth node 458 may comprise the lowest scoring and/or least ideal (e.g., not a target) node for the conversation—e.g., the customer/client is likely to seek legal action.

According to some embodiments, one or more paths taken to arrive at the twenty-eighth node 458 may comprise a "worst" or failing path from which path deviations are scored to arrive at an overall score or rank for the virtual emotive conversation training session.

Figure 5:
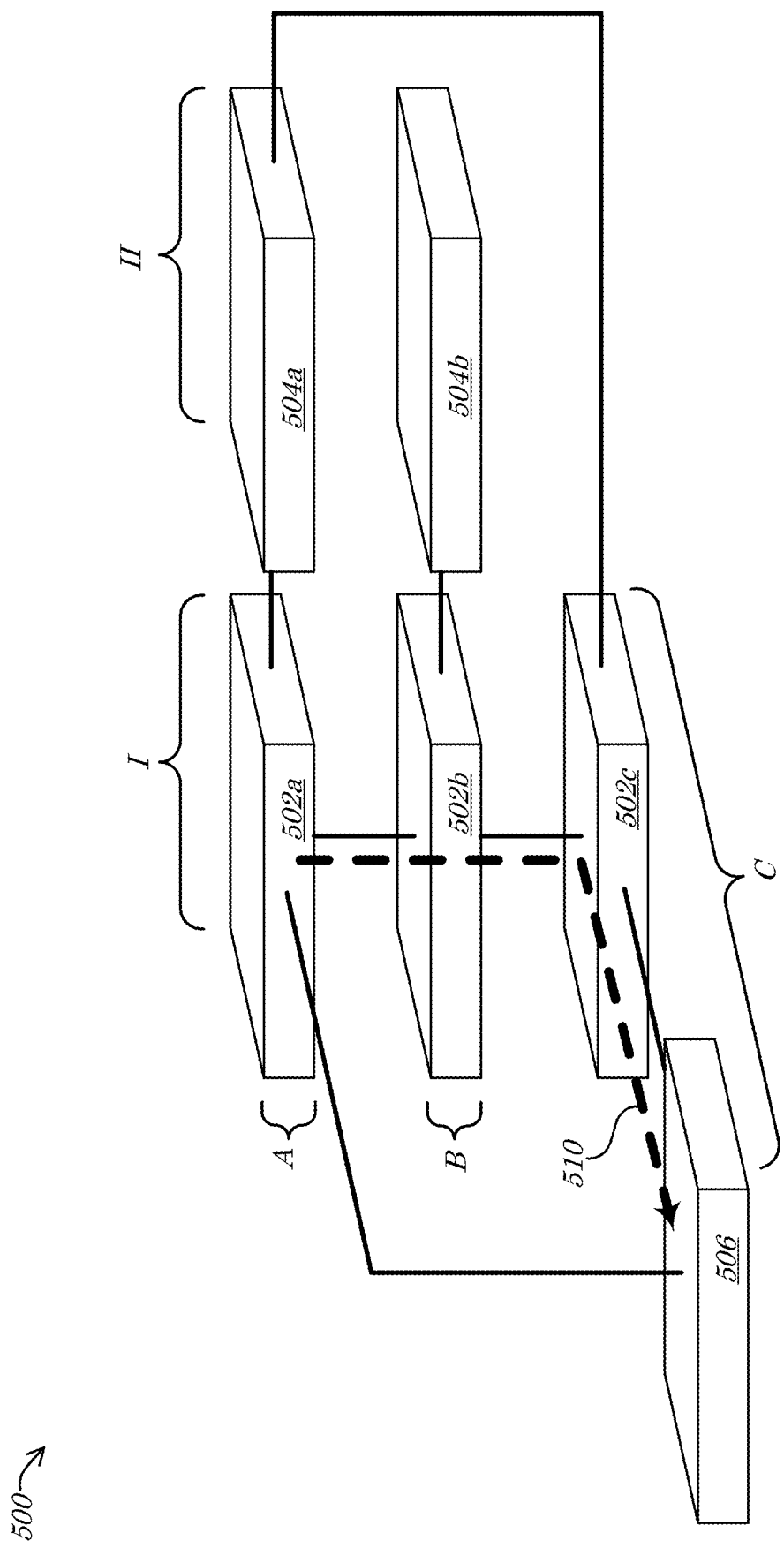
FIG. 5 is a perspective diagram of a method according to some embodiments.

Turning now to FIG. 5, a perspective diagram of a method 500 according to some embodiments is shown. In some embodiments, the method 500 may be performed and/or implemented by and/or otherwise associated with one or more specialized and/or specially-programmed computers (e.g., one or more of the user devices 102a-n, 202a-c, 302a-b, third-party device 106, the controller device 110, 210 and/or the apparatus 710 of FIG. 1, FIG. 2, FIG. 3A, FIG. 3B, and/or FIG. 7 herein), computer terminals, computer servers, computer systems and/or networks, and/or any combinations thereof (e.g., by one or more multi-threaded and/or multi-core processing units of an AI-VR emotive conversation training system). In some embodiments, the method 500 may be embodied in, facilitated by, and/or otherwise associated with various input mechanisms and/or interfaces (such as the interfaces 320a-b, 720 of FIG. 3A, FIG. 3B, and/or FIG. 7 herein).

In some embodiments, the method 500 may comprise a plurality of related nodes 502a-c, 504a-b, 506 (e.g., "leaves", in the case that the method 500 comprises and/or defines a decision tree; e.g., a 3D decision tree). According to some embodiments, the relationships (e.g., the connecting lines, not separately labeled) between the nodes 502a-c, 504a-b, 506 may be configured in a 3D manner as depicted in FIG. 5. In some embodiments, the nodes 502a-c, 504a-b, 506 may be arranged as and/or comprise entries of a matrix (e.g., a 3D matrix) and/or may otherwise be grouped and/or classified. A first set "I" of nodes 502a-c may comprise and/or represent, for example, a particular point in a simulated emotive conversation path, e.g., an originating point or a point that has been arrived at via facilitating of a virtual emotive conversational training session. According to some embodiments, the first set "I" may comprise three (3) different possible input categorizations into which user input may be characterized (e.g., based on characteristics and/or attributes thereof). Each node 502a-c may reside in and/or be characterized in a particular level or tier, such as the three vertical tiers "A", "B", or "C" as depicted.

According to some embodiments, a first tier "A" may comprise a categorization representative of a "weak" or "low" confidence level of input, for example, a second tier "B" may comprise a categorization representative of a "medium" or "average" confidence level of input, and/or a third tier "C" may comprise a categorization representative of a "strong" or "high" confidence level of input. For ease of reference and as a non-limiting example, the first tier "A" will be referred to as a "low confidence" tier, the second tier "B" will be referred to as an "average confidence" tier, and the third tier "C" will be referred to as a "high confidence" tier. In some embodiments, input received from a user (or the conversation session generally) may be advanced by the method 500 to a second set "II" of nodes 504a-b. In the case that the input is categorized in the first tier "A" and is accordingly assigned to a first sub-node 502a, the path of the conversation in accordance with the method 500 may progress to a first sub-node 504a of the second set "II". The first sub-node 504a of the second set "II" may comprise, for example, a computer-generated response to the input that is defined based on the confidence level (e.g., "A") of the input. In some embodiments, such as in the case that the input is categorized in the second tier "B" and is accordingly assigned to a second sub-node 502b, the path of the conversation in accordance with the method 500 may progress to a second sub-node 504*b* of the second set "II". The second sub-node 504*b* of the second set "II" may comprise, for example, a computer-generated response to the input that is defined based on the confidence level (e.g., "B") of the input.

In some embodiments, the second sub-node 504*b* of the second set "II" may comprise a conversational endpoint that may, for example, define an outcome (e.g., a scored outcome) of the conversation. An "average" evaluation of the user input may result, for example, in an average conversational outcome and/or score. According to some embodiments, the preprogrammed conversational pathways (e.g., 3D pathways as shown) may permit the user to advance from a lower ranked tier to a higher ranked (or otherwise better) tier. As depicted, for example, should the user provide input (e.g., second input) that is categorized in the third tier "C" in response to the first sub-node 504*a* (e.g., which may comprise a certain multi-media and/or VR output), the conversational path of the method 500 may proceed back to a third sub-node 502*c* of the first set "I". In some embodiments (as depicted), the third sub-node 502*c* of the first set "I" may comprise a node along the only pathways to a third node 506. The third node 506 may comprise, for example, a target node that provides a high score, passing mark (e.g., if it is reached), etc. In some embodiments, however, the third node 506 may not necessarily comprise a conversational endpoint and, e.g., in the case the user provides additional input that is analyzed to be negative (e.g., undesirable), the conversational path in accordance with the method 500 may proceed back to (e.g., reset) the first sub-node 502*a* of the first set "I" (e.g., back in the first tier "A").

According to some embodiments, the method 500 may define an "ideal", target, datum, and/or reference path 510 that is predesignated. As depicted, this ideal path 510 may comprise strong or "high confidence" input at the first set "I" of nodes 502*a-c* with a direct progression to the third node 506. In some embodiments, any actual path that deviates from the ideal path 510 may reduce (or increase, depending upon whether low or high scores are designated as desirable) the user's points/score. In some embodiments, any or all of the nodes 502*a-c*, 504*a-b*, 506 may comprise either user input or various rules, steps, routines, modules, algorithms, and/or engines (e.g., defined by a preprogrammed virtual emotive conversation training system). According to some embodiments, each rule may comprise and/or define one or more criteria, thresholds, and/or conditions stored in relation thereto. In some embodiments, one or more criteria, thresholds, and/or conditions may comprise at least one condition based on a mathematical formula, expression, and/or model. As a non-limiting example, the second set "II" of nodes 504*a-b* may comprise one or more (e.g., the same or different) AI modules that analyze the user input (e.g., from the first set "I" of nodes 502*a-c*) by transcribing the input, categorizing (e.g., comparing and matching) the input, and/or generating corresponding VR output (e.g., audio and/or VR elements, such as VR avatars and/or simulated conversational elements).

Figure 6:
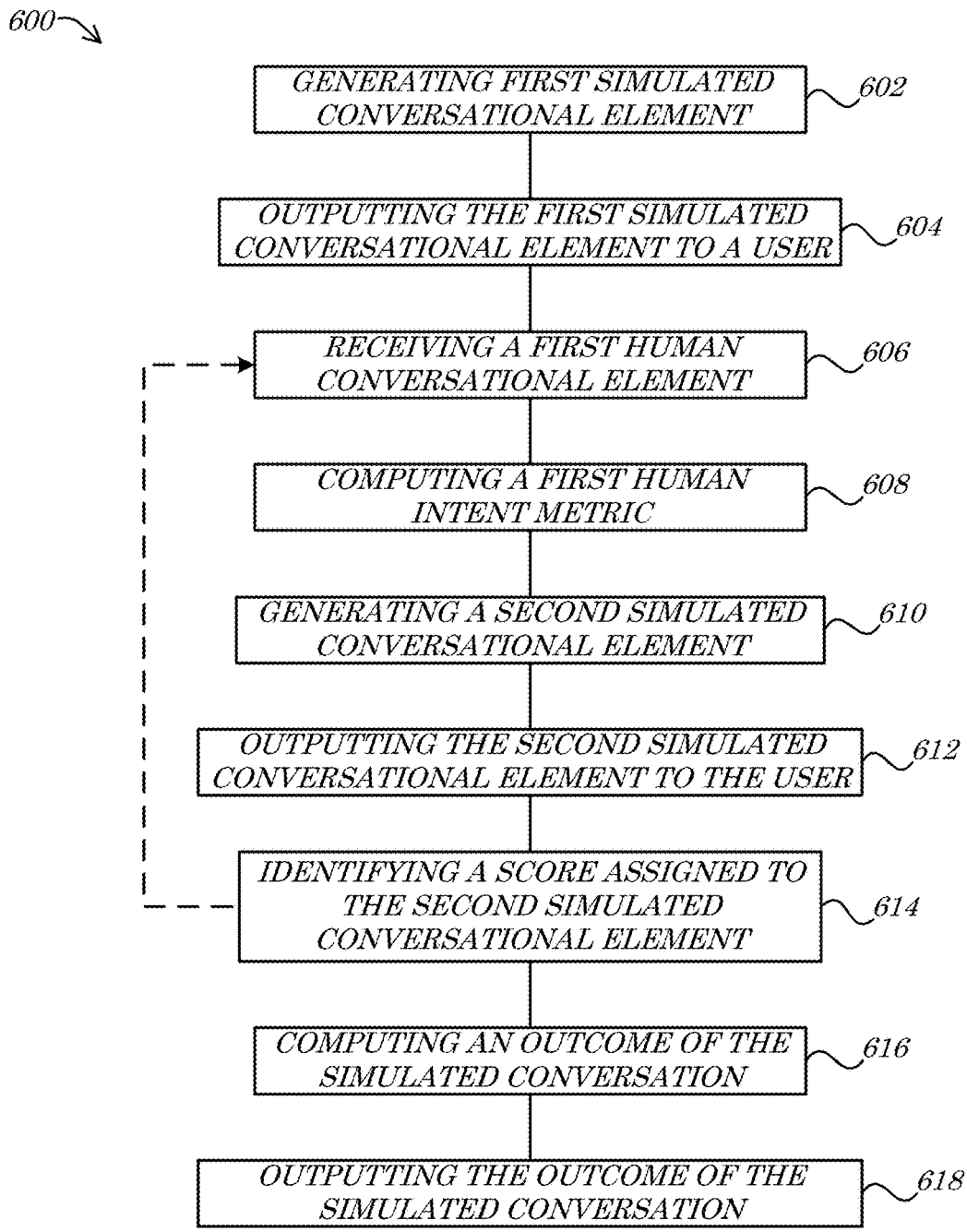
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or specially-programmed computers (e.g., one or more of the user devices 102*a-n*, 202*a-c*, 302*a-b*, third-party device 106, the controller device 110, 210 and/or the apparatus 710 of FIG. 1, FIG. 2, FIG. 3A, FIG. 3B, and/or FIG. 7 herein), computer terminals, computer servers, computer systems and/or networks, and/or any combinations thereof (e.g., by one or more multi-threaded and/or multi-core processing units of an AI-VR emotive conversation training system). In some embodiments, the method 600 may be embodied in, facilitated by, and/or otherwise associated with various input mechanisms and/or interfaces (such as the interfaces 320*a-b*, 720 of FIG. 3A, FIG. 3B, and/or FIG. 7 herein).

In some embodiments, the method 600 may comprise generating (e.g., by an electronic processing device) a first simulated conversational element, at 602. Whether as a continuation of a virtual/simulated conversation training session in response to a previously-received user input (not shown) or as an initiation of a virtual/simulated conversation training session, for example, the method 600 may comprise identifying, selecting, choosing, assembling, and/or otherwise generating at least one first simulated conversational element, such as a VR environment object, a VR avatar (and/or portions, features, and/or attributes thereof), an audio snippet (e.g., a simulated spoken phrase), and/or a graphical interface element (e.g., image, video, sound, animation, etc.). According to some embodiments, the first simulated conversational element may comprise one or more VR and/or graphical interface elements that define a facial expression of a computer-generated and/or VR avatar. The one or more VR and/or graphical interface elements may define the facial expression, for example, to convey and/or represent a first demeanor and/or level of emotion (e.g., a first emotive state). In a case where the method 600 begins or continues at 602 at a first difficulty setting or level, the first demeanor/emotional state may represent a friendly or relaxed demeanor/state. In a case where the method 600 begins or continues at 602 at a second difficulty setting or level, the first demeanor/emotional state may represent an angry, frustrated, defensive, and/or combative demeanor/state. In the first case, for example, the simulated emotive conversation training session of the method 600 may be easier for a user to navigate to achieve a desirable (e.g., passing) outcome and/or score. In the second case, the simulated emotive conversation training session of the method 600 may be more difficult and the user may be required to take more advanced and/or proactive actions to navigate to achieve a desirable (e.g., passing) outcome and/or score. In some embodiments, the first demeanor/emotional state may be defined utilizing a random number seed (e.g., to provide a less predictable conversational flow to the user).

According to some embodiments, the method 600 may comprise outputting (e.g., by the electronic processing device and/or via a user device, such as a VR headset) the first simulated conversational element to a user, at 604. Based on one or more hardware/electronic devices utilized by a user (e.g., trainee), for example, one or more signals and/or other data representing and/or defining (e.g., indicative of) the first simulated conversational element may be transmitted/sent to the user's device(s), e.g., causing the user's device(s) to output the first simulated conversational element (or an indication thereof). In some embodiments, the outputting may comprise sending instructions to a VR (and/or Augmented Reality (AR)) rendering device that constructs a VR environment and/or avatar based on the first simulated conversational element. The outputting at 604 may comprise, for example, displaying a plurality of audio and/or visual elements comprising the first simulated conversational element, to define a VR avatar (and/or actions—e.g., speech, thereof) having the first demeanor/emotional state.

In some embodiments, the method 600 may comprise receiving (e.g., by the electronic processing device) a first human conversational element (e.g., input), at 606. Whether in response to the outputting of the first simulated conversational element at 604 or otherwise, for example, a simulated conversational training system may receive one or more signals from the user's device(s), such signals defining and/or being indicative of one or more user (e.g., "human") inputs. Such inputs may comprise, but are not limited to, images of the user, images of the user's environment (e.g., real-world and/or virtual), sensor data descriptive of the user and/or an attribute of the user, such as audio data, video data, movement data, and/or user-defined input selections, such as joystick movement data, button press data, menu choice selection data, etc. In the case that the user device comprises a VR headset system (e.g., with or without hand position controllers/sensors), for example, the input may comprise recorded audio of the user speaking along with user gaze data (e.g., direction of eye gaze), head tilt data, and/or VR environment positioning data (e.g., where, within the VR environment, the user has provided input to navigate/move to).

According to some embodiments, the method 600 may comprise computing (e.g., by the electronic processing device and/or by execution of an AI intent module) a first human intent metric, at 608. Any or all input and/or data received from (and/or otherwise descriptive of) the user, such as the first human conversational element received at 606 for example, may be processed by the simulated conversational training system and/or a module or portion thereof, such as an AI intent module. In some embodiments, the input/data may be processed prior to being analyzed. In the case that the first human conversational element comprises an audio recording of speech input from the user, for example, the audio recording may be digitized, filtered, decompressed, decoded, and/or transcribed (e.g., to text). According to some embodiments, the input may be processed by the AI intent module by executing stored AI intent module instructions that: (i) identify one or more attributes of the input (e.g., individual words, phrases, a tone, cadence, volume, etc.), (ii) compare the one or more attributes to stored attributes, (iii) identify at least one match between the one or more attributes and the stored attributes, and (iv) compute, based on the at least one match, the first human intent metric. As an example, a tone of the user's speech input may be matched to stored data for similar tones, a natural language meaning of the user's speech input (e.g., transcribed) may be matched to stored data for similar natural language meanings, and/or an eye gaze direction of the user at a time of the speech input may be matched to stored data for similar eye gaze directions. The AI intent module may apply stored rules to the matches to determine, for example, that the natural language meaning is categorized as "negative" (e.g., the user is being rude or unfriendly), the tone is categorized as "aggressive", and the eye gaze is directly toward the VR avatar (in the VR environment) and is accordingly categorized as "direct" (or in context of the other attributes, "aggressive"). According to some embodiments, the first human intent metric may comprise a qualitative parameter value (e.g., "negative", "overconfident", or "aggressive"; e.g., one of a plurality of predefined emotional levels and/or states) and/or a quantitative value (e.g., ninety-four (94) on a scale from zero (0) to one hundred (100), three hundred twenty-two (322) points, etc.).

According to some embodiments, the first human intent metric may be utilized to define an emotional state and/or emotive ranking of one or more of the user, the simulated customer/client, and/or the overall conversation. The conversation, user, and/or simulated customer/client may be assigned to and/or comprise a first emotional state prior to the receiving of the first human conversational element at 606, for example, and the evaluation of the first human conversational element may cause one or more of these states to change. In the case that each of the user, the simulated customer/client, and the overall conversation were initially (or previously) at a first emotional state, such as a "calm", "friendly", "acceptable", "average", and/or a two hundred (200)-level state, for example, a negative or poor evaluation of the first human conversational element (e.g., resulting in a negative or poor first human intent metric) may cause (i) the first emotional state of the user to change (or be revaluated) to "poor", "aggressive", and/or a one hundred (100)-level state, (ii) the first emotional state of the simulated customer/client to change to "confused", "defensive", and/or a one hundred fifty (150)-level state, and/or (ii) the first emotional state of the overall conversation to stay at "average," but drop in points to a one hundred eighty (180)-level state. In some embodiments, any or all of these qualitative and/or quantitative emotional state evaluations may comprise and/or define one or more emotional state metrics.

In some embodiments, the method 600 may comprise generating (e.g., by the electronic processing device) a second simulated conversational element, at 610. The second simulated conversational element may, for example, be identified, selected, chosen, constructed, and/or generated based on the first human intent metric computed at 608 and/or based on one or more emotional state metrics derived therefrom. According to some embodiments, the generating of the second simulated conversational element may comprise identifying, selecting, choosing, assembling, and/or otherwise generating at least one second simulated conversational element, such as a VR environment object, a VR avatar (and/or portions, features, and/or attributes thereof), an audio snippet (e.g., a simulated spoken phrase), and/or a graphical interface element (e.g., image, video, sound, animation, etc.). According to some embodiments, the second simulated conversational element may comprise one or more VR and/or graphical interface elements that define an updated facial expression of a computer-generated and/or VR avatar. The one or more VR and/or graphical interface elements may define the updated facial expression, for example, to convey and/or represent a second demeanor and/or level of emotion (e.g., a second emotive state—e.g., as computed based on the first human intent metric). In a case where the method 600 continues at 610 from 608, for example, the second demeanor/emotional state may represent a changed state that is either neutral, more negative, or more positive than the first emotional state (e.g., with respect to the user, the simulated customer/client, and/or the overall conversation). In the case of the example evaluation of the first human intent metric at 608 where the user has provided a negative or poor input (e.g., based on emotive conversation training rules/thresholds), for example, the emotional state of the simulated customer/client may be more negative, and the second simulated conversational element may accordingly comprise elements representing and/or defining an updated facial expression, such as a frown.

According to some embodiments, the method 600 may comprise outputting (e.g., by the electronic processing device and/or via the user device) the second simulated conversational element to the user, at 612. Based on the one or more hardware/electronic devices utilized by the user (e.g., trainee), for example, one or more signals and/or other data representing and/or defining (e.g., indicative of) the second simulated conversational element may be transmitted/sent to the user's device(s), e.g., causing the user's device(s) to output the second simulated conversational element (or an indication thereof). In some embodiments, the outputting may comprise sending instructions to the VR (and/or AR) rendering device that constructs the VR environment and/or avatar based on the second simulated conversational element. The outputting at 612 may comprise, for example, displaying a plurality of audio and/or visual elements comprising the second simulated conversational element, to define an updated version of the VR avatar (and/or actions—e.g., speech, thereof) having the second demeanor/emotional state. In such a manner, for example, the user may be presented with a simulated effect that their input has had on the simulated customer/client (e.g., they have made them angry).

In some embodiments, the method 600 may comprise identifying (e.g., by the electronic processing device) a score assigned to the second simulated conversational element, at 614. In the case that the second simulated conversational element and/or associated second emotional state and/or associated human intent metric have caused the generation (e.g., selection and/or identification) and/or outputting of the second simulated conversational element, for example, the user may be assigned a score assigned to the second simulated conversational element (and/or to the second emotional state and/or first human intent metric). The user may have "earned" such a score, for example, by having provided the first human conversational element having a content and/or attributes that have moved the conversational path to the second simulated conversational element. In some embodiments, various decision tree leaves or nodes, such as the second simulated conversational element (the selection, generation, and/or outputting thereof) may be assigned different point levels based on their perceived desirability with respect to the simulated conversation. According to some embodiments, the scoring may also or alternatively be based upon a route or path and/or an amount of time taken to arrive at the particular node/leaf in the conversational path. According to some embodiments, and as depicted by the dotted line in FIG. 6, the method 600 may proceed from the identifying of the score at 614 back to receiving an additional human conversational element (e.g., a second human conversational element), at 606. The method 600 may, for example, continue through multiple iterations of outputting simulated conversational elements, receiving human conversational input in response thereto, computing human intent metrics, and/or scoring the nodes and/or paths of the simulated conversation. In some embodiments, scores may be reduced and/or decrease with successive iterations, incentivizing the user to conduct more efficient conversations.

According to some embodiments, the method 600 may comprise computing (e.g., by the electronic processing device) an outcome of the simulated conversation, at 616. In some embodiments, arrival of the conversational flow to a particular node/leaf may define a particular outcome assigned thereto. In the case that an end-node/leaf (e.g., a node or leaf having no sub-nodes or leaves therefrom) having been arrived at, for example, such end-node may define a particular outcome for the training session such as "pass", "fail", etc. According to some embodiments, the outcome may comprise a score based upon any or all scored nodes, paths, and/or other achievements that have occurred along the conversational path. Points may be awarded for having arrived at the end-node in under a threshold amount of elapsed time, for example, and/or may be deducted for deviations from one or more target conversational paths. In some embodiments, all points (positive and/or negative) may be summed, averaged, and/or otherwise mathematically aggregated to compute a final or total score, ranking, etc., for the conversational training session (and/or for the user).

In some embodiments, the method 600 may comprise outputting (e.g., by the electronic processing device and/or via the user device) the outcome of the simulated conversation, at 618. Based on the one or more hardware/electronic devices utilized by the user (e.g., trainee), for example, one or more signals and/or other data representing and/or defining (e.g., indicative of) the outcome of the simulated conversation may be transmitted/sent to the user's device(s), e.g., causing the user's device(s) to output the outcome of the simulated conversation (or an indication thereof). In some embodiments, the outputting of the outcome of the simulated conversation may comprise a visual, audio, and/or other indication depicting and/or conveying the user's score, rank, achievements (e.g., pass/fail), etc. In such a manner, for example, the user may easily participate in a highly-realistic simulated/virtual emotive conversation training session, obtain their results, and then (perhaps) re-attempt additional sessions to improve their score/performance.

According to some embodiments, the system and/or a human trainer/operator may dynamically provide input into and/or change the conversational path, e.g., based on a performance of the user in a given session. In the case that the user is scoring adequately or even well, but is soft-spoken (e.g., as computed based on their audio inputs), for example, the system (and/or operator) may adjust the conversational path in an attempt to push the user out of their comfort zone (e.g., either to increase their level of presence in the conversation or to force them to deal with unusual and/or unpredictable circumstances). As real-life people can often be unpredictable and/or have hidden (and/or unusual) triggers, the system (and/or the operator) may dynamically (e.g., utilizing a random number seed as input and/or as a path-changing trigger) alter the conversational path to create a disjointed (e.g., unexpected) flow. This additional level of automatic training may assist users that are performing well to further advance their skills by testing their ability to handle unexpected situations. In some embodiments, certain nodes/leaves and/or paths associated with dynamic, random, and/or operator-defined path adjustments may be scored more highly than standard conversational nodes (e.g., in the case that the user successfully navigates the conversation from such nodes to a desirable/target outcome).

IV. Pattern-Based Multi-Stage Deterministic Data
Classification Apparatus, Articles of Manufacture,
& Algorithms Turning to FIG. 7, a block diagram of an apparatus 710 according to some embodiments is shown. In some embodiments, the apparatus 710 may be similar in configuration and/or functionality to one or more of the user devices 102a-n, 202a-c, 302a-b, third-party device 106, and/or the controller device 110, 210 of FIG. 1, FIG. 2, FIG. 3A, and/or FIG. 3B herein. The apparatus 710 may, for example, execute, process, facilitate, and/or otherwise be associated with the methods/algorithms 400, 500, 600, 900 of FIG. 4A, FIG. 4B, FIG. 5, FIG. 6, and/or FIG. 9 herein, and/or portions or combinations thereof. In some embodiments, the apparatus 710 may comprise a processing device 712, a communication device 714, an input device 716, an output device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 may be included in the apparatus 710 without deviating from the scope of embodiments described herein.

According to some embodiments, the processor 712 may be or include any type, quantity, and/or configuration of processor that is or becomes known. The processor 712 may comprise, for example, an Intel® IXP 2800 network processor or an Intel® XEON™ Processor coupled with an Intel® E7501 chipset. In some embodiments, the processor 712 may comprise multiple interconnected processors, microprocessors, and/or micro-engines. According to some embodiments, the processor 712 (and/or the apparatus 710 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 710 comprises a server, such as a blade server, necessary power may be supplied via a standard AC outlet, power strip, surge protector, and/or Uninterruptible Power Supply (UPS) device.

In some embodiments, the communication device 714 may comprise any type or configuration of communication device that is or becomes known or practicable. The communication device 714 may, for example, comprise a Network Interface Card (NIC), a telephonic device, a cellular network device, a router, a hub, a modem, and/or a communications port or cable. In some embodiments, the communication device 714 may be coupled to receive user input data, e.g., from a user device (not shown in FIG. 7). The communication device 714 may, for example, comprise a Bluetooth® Low Energy (BLE) and/or RF receiver device and/or a camera or other imaging device that acquires data from a user (not separately depicted in FIG. 7) and/or a transmitter device that provides the data to a remote server and/or server or communications layer (also not separately shown in FIG. 7). According to some embodiments, the communication device 714 may also or alternatively be coupled to the processor 712. In some embodiments, the communication device 714 may comprise an infrared (IR), RF, Bluetooth™, Near-Field Communication (NFC), and/or Wi-Fi® network device coupled to facilitate communications between the processor 712 and another device (such as a remote user device, not separately shown in FIG. 7).

In some embodiments, the input device 716 and/or the output device 718 are communicatively coupled to the processor 712 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., by a conversational training professional, to monitor, guide, and/or effect a virtual emotive conversation training session, as described herein). In some embodiments, the input device 716 may comprise a sensor, such as a camera, sound, light, and/or proximity sensor (e.g., of a VR headset system, such as one or more VR hand controls), configured to measure parameter values and report measured values via signals to the apparatus 710 and/or the processor 712. The output device 718 may, according to some embodiments, comprise a display screen and/or other practicable output component and/or device. The output device 718 may, for example, provide an interface (such as the interface 720 and/or the interfaces 320*a-b* of FIG. 3A and/or FIG. 3B) via which functionality for AI-VR emotive conversation training is provided to a user (e.g., via a website and/or mobile device application). According to some embodiments, the input device 716 and/or the output device 718 may comprise and/or be embodied in a single device, such as a touch-screen monitor.

The memory device 740 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of transcription instructions 742-1, intent instructions 742-2, conversational state instructions 742-3, scoring instructions 742-4, interface instructions 742-5, input data 744-1, rules data 744-2, and/or interface element data 744-3. In some embodiments, the transcription instructions 742-1, intent instructions 742-2, conversational state instructions 742-3, scoring instructions 742-4, interface instructions 742-5, input data 744-1, rules data 744-2, and/or interface element data 744-3 may be utilized by the processor 712 to provide output information via the output device 718 and/or the communication device 714.

According to some embodiments, the transcription instructions 742-1 may be operable to cause the processor 712 to process the input data 744-1, rules data 744-2, and/or interface element data 744-3 in accordance with embodiments as described herein. Input data 744-1, rules data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the transcription instructions 742-1. In some embodiments, input data 744-1, rules data 744-2, and/or interface element data 744-3 may be fed by the processor 712 through one or more mathematical and/or statistical formulas and/or models in accordance with the transcription instructions 742-1 to merge transcribe, decode, convert, and/or otherwise process user input, as described herein.

In some embodiments, the intent instructions 742-2 may be operable to cause the processor 712 to process the input data 744-1, rules data 744-2, and/or interface element data 744-3 in accordance with embodiments as described herein. Input data 744-1, rules data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the intent instructions 742-2. In some embodiments, input data 744-1, rules data 744-2, and/or interface element data 744-3 may be fed by the processor 712 through one or more mathematical and/or statistical formulas and/or models in accordance with the intent instructions 742-2 to identify, classify, and/or otherwise compute an intent and/or intent classification, e.g., based on the transcribed user input, as described herein.

According to some embodiments, the conversational state instructions 742-3 may be operable to cause the processor 712 to process the input data 744-1, rules data 744-2, and/or interface element data 744-3 in accordance with embodiments as described herein. Input data 744-1, rules data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the conversational state instructions 742-3. In some embodiments, input data 744-1, rules data 744-2, and/or interface element data 744-3 may be fed by the processor 712 through one or more mathematical and/or statistical formulas and/or models in accordance with the conversational state instructions 742-3 to identify, classify, and/or otherwise compute an emotive state of a user, conversation, and/or simulated customer/client, e.g., based on the intent and/or intent classification, as described herein.

In some embodiments, the scoring instructions 742-4 may be operable to cause the processor 712 to process the input data 744-1, rules data 744-2, and/or interface element data 744-3 in accordance with embodiments as described herein. Input data 744-1, rules data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the scoring instructions 742-4. In some embodiments, input data 744-1, rules data 744-2, and/or interface element data 744-3 may be fed by the processor 712 through one or more mathematical and/or statistical formulas and/or models in accordance with the scoring instructions 742-4 to score and/or rank one or more conversational nodes, paths, outcomes, users, and/or conversational training sessions, as described herein.

According to some embodiments, the interface instructions 742-5 may be operable to cause the processor 712 to process the input data 744-1, rules data 744-2, and/or interface element data 744-3 in accordance with embodiments as described herein. Input data 744-1, rules data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the interface instructions 742-5. In some embodiments, input data 744-1, rules data 744-2, and/or interface element data 744-3 may be fed by the processor 712 through one or more mathematical and/or statistical formulas and/or models in accordance with the interface instructions 742-5 to generate and/or output various interface instances, VR environments, VR avatars, and/or other virtual conversational elements, as described herein.

According to some embodiments, the apparatus 710 may comprise the cooling device 750. According to some embodiments, the cooling device 750 may be coupled (physically, thermally, and/or electrically) to the processor 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

Referring to FIG. 8A, FIG. 8B, FIG. 8C, FIG. 8D, and FIG. 8E, perspective diagrams of exemplary data storage devices 840a-e according to some embodiments are shown. The data storage devices 840a-e may, for example, be utilized to store instructions and/or data, such as the transcription instructions 742-1, intent instructions 742-2, conversational state instructions 742-3, scoring instructions 742-4, interface instructions 742-5, input data 744-1, rules data 744-2, and/or interface element data 744-3, each of which is presented in reference to FIG. 7 herein. In some embodiments, instructions stored on the data storage devices 840a-e may, when executed by a processor, cause the implementation of and/or facilitate the methods/algorithms 400, 500, 600, 900 of FIG. 4A, FIG. 4B, FIG. 5, FIG. 6, and/or FIG. 9 herein, and/or portions or combinations thereof.

According to some embodiments, the first data storage device 840a may comprise one or more various types of internal and/or external hard drives. The first data storage device 840a may, for example, comprise a data storage medium 846 that is read, interrogated, and/or otherwise communicatively coupled to and/or via a disk reading device 848. In some embodiments, the first data storage device 840a and/or the data storage medium 846 may be configured to store information utilizing one or more magnetic, inductive, and/or optical means (e.g., magnetic, inductive, and/or optical-encoding). The data storage medium 846, depicted as a first data storage medium 846a for example (e.g., breakout cross-section "A"), may comprise one or more of a polymer layer 846a-1, a magnetic data storage layer 846a-2, a non-magnetic layer 846a-3, a magnetic base layer 846a-4, a contact layer 846a-5, and/or a substrate layer 846a-6. According to some embodiments, a magnetic read head 848a may be coupled and/or disposed to read data from the magnetic data storage layer 846a-2.

In some embodiments, the data storage medium 846, depicted as a second data storage medium 846b for example (e.g., breakout cross-section "B"), may comprise a plurality of data points 846b-2 disposed with the second data storage medium 846b. The data points 846b-2 may, in some embodiments, be read and/or otherwise interfaced with via a laser-enabled read head 848b disposed and/or coupled to direct a laser beam through the second data storage medium 846b.

In some embodiments, the second data storage device 840b may comprise a CD, CD-ROM, DVD, Blu-Ray™ Disc, and/or other type of optically-encoded disk and/or other storage medium that is or becomes know or practicable. In some embodiments, the third data storage device 840c may comprise a USB keyfob, dongle, and/or other type of flash memory data storage device that is or becomes know or practicable. In some embodiments, the fourth data storage device 840d may comprise RAM of any type, quantity, and/or configuration that is or becomes practicable and/or desirable. In some embodiments, the fourth data storage device 840d may comprise an off-chip cache, such as a Level 2 (L2) cache memory device. According to some embodiments, the fifth data storage device 840*e* may comprise an on-chip memory device, such as a Level 1 (L1) cache memory device.

The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media). The data storage devices 840*a-e* may generally store program instructions, algorithms, software engines, code, and/or modules that, when executed by a processing device cause a particular machine to function in accordance with one or more embodiments described herein.

Figure 9:
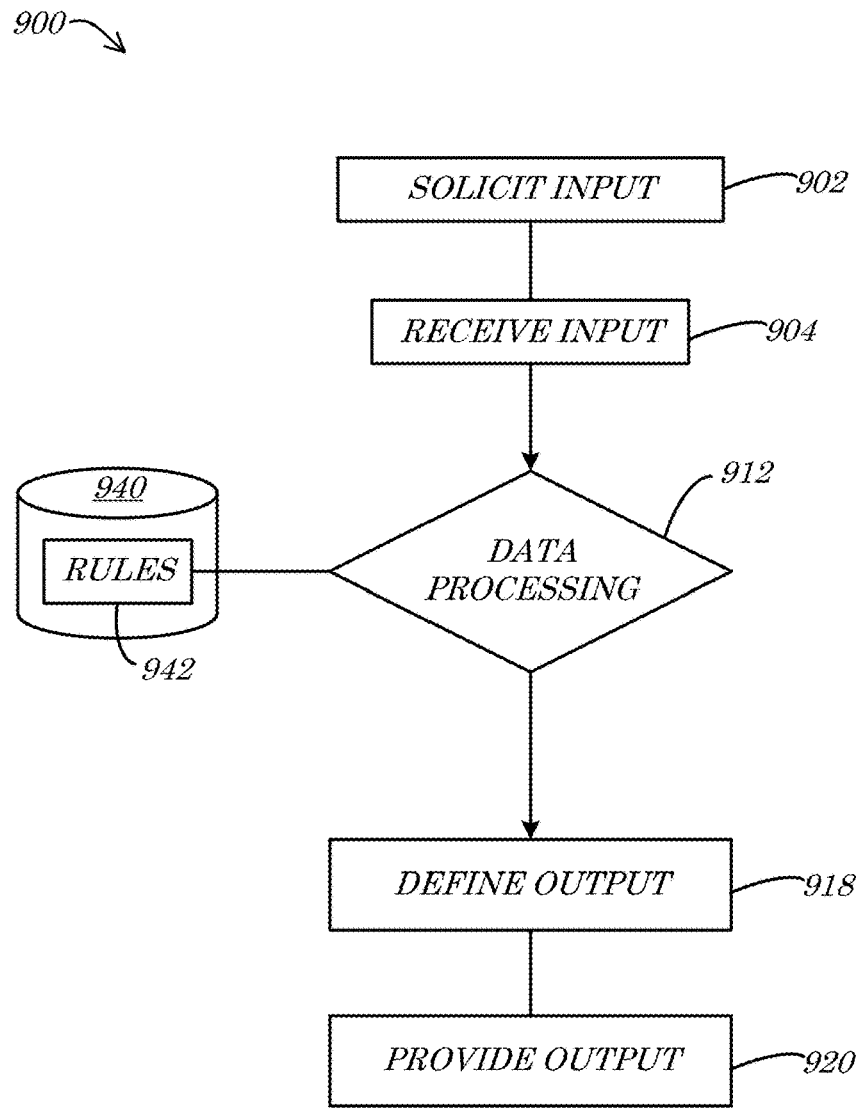
FIG. 9 is flowchart of an algorithm according to some embodiments.

With reference to FIG. 9, for example, the data storage devices 840*a-e* may store and/or define an algorithm 900. The algorithm 900 may comprise, for example, one or more software programs, modules, engines, and/or applications coded to perform any of the methods/algorithms 400, 500, 600, 900 of FIG. 4A, FIG. 4B, FIG. 5, FIG. 6, and/or FIG. 9 herein, and/or portions or combinations thereof. The algorithm 900, and any reference to the term "algorithm" herein, refers to any set of defined instructions that operate upon input to define and/or provide output. The algorithm 900 may, for example, be specifically programmed and/or otherwise defined to instruct a computer or other device (not shown) to solve a particular problem (e.g., logical) and/or resolve a particular mathematical calculation (e.g., arithmetic). In some embodiments, the algorithm 900 may be written and/or defined as a series or sequence of instructions encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device, such as a CPU).

According to some embodiments, the algorithm 900 may comprise soliciting input, at 902. Input from one or more sources may be searched for and/or queried, by structuring and/or executing a database query and/or by sending a data communication signal or "handshake", such as is common with Bluetooth® short-range communication protocols. In some embodiments, the algorithm 900 may comprise receiving the input, at 904. Whether solicited or otherwise provided and/or acquired (e.g., loaded and/or downloaded), for example, the input for the algorithm 900 may be received, identified, and/or otherwise processed and/or located. According to some embodiments, the algorithm 900 may comprise data processing, at 912. The data processing 912 may, for example, comprise execution of one or more logical and/or computational procedures, modules, scripts, and/or routines that may be stored in a memory device 940 (e.g., similar to the data storage devices 840*a-e*) as a set of instructions or rules 942 and/or that may be defined and/or implemented by one or more electrical, mechanical, and/or physical components, such as logic gates, diodes, transistors, relays, and/or switches (e.g., operable to execute any of the methods/algorithms 400, 500, 600, 900 of FIG. 4A, FIG. 4B, FIG. 5, FIG. 6, and/or FIG. 9 herein, and/or portions or combinations thereof).

In some embodiments, execution of the algorithm 900 may comprise a loading of the rules 942 into the memory 940 and/or into an electronic processing system (not shown) and/or an activation of one or more logic gates and/or other electrical and/or mechanical components. The algorithm 900 may operate upon the input in accordance with the rules 942 to achieve a result by defining output, at 918. The algorithm 900 may, for example, generate, produce, define, identify, calculate, and/or otherwise compute output based on an application of the data processing 912 utilizing the rules 942 and any or all input receiving at 904. According to some embodiments, the algorithm 900 may comprise providing the output, at 920. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as e-mail addresses, URL locations, MAC addresses, and/or broadcast radio frequencies.

According to some embodiments, the data processing at 912 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 900 may partially or completely comprise, for example, instructions and/or steps that are well known, such as steps and/or instructions operable to calculate an area (length times width), volume (length times width times height), distance (difference between two locations), velocity (distance over time), acceleration (velocity over time), and/or any other known mathematical and/or logical (if/then statements) procedures. For any and all known procedures and/or instructions, the discrete details of such instructions are represented by the data processing at 912 and are not listed herein as one of ordinary skill in the art would readily comprehend both what such technological knowledge entails and that the inventor has possession of such knowledge. Instructions that may be included within and/or comprise the data processing at 912 (and/or the algorithm 900) may include, for example, but are not limited to, any known or practicable: (i) transcription algorithms (e.g., Automatic Speech Recognition (ASR) and/or speech-to-text algorithms, e.g., utilizing digitized audio, spectrograms, and/or MFCC (Mel-Frequency Cepstral Coefficients), (ii) VR environment construction and/or generation algorithms, (iii) VR avatar generation and/or animation algorithms, (iv) AI and/or ML data input classification algorithms, (v) data transmission algorithms, (vi) data encoding algorithms, (vii) data decoding algorithms, (viii) logical and/or mathematical data comparison algorithms, and (ix) data searching (e.g., keyword searching) algorithms.

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for Artificial Intelligence (AI) Virtual Reality (VR) emotive conversation training, comprising:
    generating, by an execution of a conversational state program stored in a non-transitory data storage device in communication with a conversation training controller comprising a plurality of electronic processing devices, and by the conversation training controller, a first virtual conversational element of a simulated conversation, wherein the first virtual conversational element comprises a first version of a Virtual Reality (VR) avatar;
    outputting, to a human participant of the simulated conversation and via a VR headset, an indication of the first virtual conversational element, wherein the outputting further comprises generating a first version of a VR environment and outputting the first version of the VR environment via the VR headset, and wherein the first version of the VR environment comprises the first version of the VR avatar, and the first virtual conversational element further comprises a positioning of the VR avatar at a first location in the virtual environment that is offset by a first distance from a center of eye orientation of the human participant;
    receiving, from a sensor device, input descriptive of a first human conversational element of the human participant of the simulated conversation;
    computing, by an execution of an AI natural language intent model stored in the non-transitory data storage device, and by the conversation training controller, and utilizing the first human conversational element of the human participant of the simulated conversation as input, a first human intent metric;
    generating, by an execution of the conversational state program by the conversation training controller, and utilizing the first human intent metric as input, a second virtual conversational element of the simulated conversation, wherein the second virtual conversational element comprises a second version of the VR avatar, and wherein the second virtual conversational element comprises a physical attribute of the VR avatar;
    outputting, to the human participant of the simulated conversation and via the VR headset, an indication of the second virtual conversational element, wherein the outputting further comprises generating a second version of the VR environment and outputting the second version of the VR environment via the VR headset, and wherein the second version of the VR environment comprises the second version of the VR avatar, and the physical attribute of the VR avatar comprises a positioning of the VR avatar at a second location in the virtual environment that is offset by a second distance from the center of eye orientation of the human participant;
    identifying, by the conversation training controller, a score assigned to the second virtual conversational element of the simulated conversation;
    computing, by the conversation training controller and utilizing the score assigned to the second virtual conversational element of the simulated conversation, an outcome of the simulated conversation; and
    outputting, to the human participant of the simulated conversation, an indication of the outcome of the simulated conversation.

2. The method of claim 1, wherein the input descriptive of the first human conversational element of the human participant of the simulated conversation is received in response to the outputting of the indication of the first virtual conversational element.

3. The method of claim 1, wherein the indication of the first virtual conversational element comprises a first computer-generated audio segment comprising a first demeanor.

4. The method of claim 3, wherein the indication of the second virtual conversational element further comprises a second computer-generated audio segment comprising a second demeanor.

5. The method of claim 1, wherein the physical attribute of the VR avatar further comprises at least one of a mouth attribute, a lip attribute, a cheek attribute, an eye attribute, an eyebrow attribute, a head tilt attribute, and an additional avatar position attribute.

6. The method of claim 5, wherein the physical attribute further comprises the additional avatar position attribute and wherein the additional avatar position attribute comprises a virtual distance of the VR avatar from a virtual position of the human participant.

7. The method of claim 1, wherein the input descriptive of the first human conversational element of the human participant of the simulated conversation comprises audio input.

8. The method of claim 7, wherein the computing of the first human intent metric by the AI natural language intent model comprises:
   identifying at least one of a cadence, a volume, a pitch, and a tone of the audio input; and
   computing, utilizing the identified at least one of the cadence, the volume, the pitch, and the tone of the audio input as input for trained AI logic, the first human intent metric.

9. The method of claim 1, wherein the input descriptive of the first human conversational element of the human participant of the simulated conversation comprises sensor data descriptive of the human participant of the simulated conversation.

10. The method of claim 9, wherein the computing of the first human intent metric by the AI natural language intent model comprises:
    identifying, based on the sensor data, at least one of an eye gaze direction, a head angle, a shoulder angle, a hand gesture, a foot position, and a stance of the human participant of the simulated conversation; and
    computing, utilizing the identified at least one of the eye gaze direction, the head angle, the shoulder angle, the hand gesture, the foot position, and the stance of the human participant of the simulated conversation as input for trained AI logic, the first human intent metric.

11. The method of claim 1, wherein the first human intent metric comprises one of a plurality of emotion levels.

12. The method of claim 1, wherein the first virtual conversational element further comprises a first demeanor of the VR avatar, and wherein the second virtual conversational element further comprises a second demeanor of the VR avatar.

13. The method of claim 1, wherein the computing of the second virtual conversational element of the simulated conversation further utilizes a random number seed as input.

14. The method of claim 1, wherein the conversational state program defines a simulated conversation decision tree, wherein each of the first and second virtual conversational elements comprise leaves of the decision tree, wherein the score assigned to the second virtual conversational element of the simulated conversation is assigned to a corresponding leaf of the decision tree, and wherein other scores are assigned to other leaves of the decision tree.

15. The method of claim 14, wherein the conversational state program defines at least one target path through the decision tree and wherein the outcome of the simulated conversation is based at least in part on a comparison of a path associated with the simulated conversation and the at least one target path.

16. The method of claim 1, further comprising:
    receiving, from the sensor device and in response to the outputting of the indication of the second virtual conversational element, input descriptive of a second human conversational element of the human participant of the simulated conversation;
    computing, by an execution of the AI natural language intent model by the conversation training controller, and utilizing the second human conversational element of the human participant of the simulated conversation as input, a second human intent metric;
    generating, by an execution of the conversational state program by the conversation training controller, and utilizing the second human intent metric as input, a third virtual conversational element of the simulated conversation;
    identifying, by the conversation training controller, a score assigned to the third virtual conversational element of the simulated conversation; and
    wherein the computing of the outcome of the simulated conversation by the conversation training controller further comprises utilizing the score assigned to the third virtual conversational element of the simulated conversation.

17. The method of claim 16, wherein the computing of the outcome of the simulated conversation comprises adding the scores of the second and third virtual conversational elements of the simulated conversation.

* * * * *